US010504284B2

(12) United States Patent
Xie et al.

(10) Patent No.: US 10,504,284 B2
(45) Date of Patent: Dec. 10, 2019

(54) METHOD FOR AUTOMATIC MODELING OF COMPLEX BUILDINGS WITH HIGH ACCURACY

(71) Applicant: Hongyu Xie, Guangzhou, Guangdong (CN)

(72) Inventors: Hongyu Xie, Guangdong (CN); Changhui Li, Guangdong (CN); Qiaoxin Huang, Guangdong (CN); Junhua Zhu, Guangdong (CN); Chuanhao Tan, Guangdong (CN); Shien Xie, Guangdong (CN)

(73) Assignee: Hongyu Xie, Guangzhou (CN)

( * ) Notice: Subject to any disclaimer, the term of this patent is extended or adjusted under 35 U.S.C. 154(b) by 6 days.

(21) Appl. No.: 15/653,576

(22) Filed: Jul. 19, 2017

(65) Prior Publication Data
US 2018/0025541 A1 Jan. 25, 2018

(30) Foreign Application Priority Data

Jul. 19, 2016 (CN) .......................... 2016 1 0563422

(51) Int. Cl.
*G06T 15/00* (2011.01)
*G06T 17/20* (2006.01)
*G06T 7/62* (2017.01)
*G06T 7/50* (2017.01)
*G06T 7/13* (2017.01)
*G06T 17/05* (2011.01)

(52) U.S. Cl.
CPC .............. *G06T 17/20* (2013.01); *G06T 7/13* (2017.01); *G06T 7/50* (2017.01); *G06T 7/62* (2017.01); *G06T 17/05* (2013.01); *G06T 2207/30184* (2013.01); *G06T 2210/04* (2013.01); *G06T 2215/16* (2013.01)

(58) Field of Classification Search
CPC .... G06T 7/62; G06T 7/50; G06T 7/13; G06T 2215/16; G06T 2207/30184; G06T 2210/04; G06T 17/20
USPC ........................................................ 345/419
See application file for complete search history.

(56) References Cited

U.S. PATENT DOCUMENTS 7,728,833 B2 * 6/2010 Verma .................... G06T 17/20
345/420
9,098,655 B2 * 8/2015 Plummer ............... G06Q 40/00
10,013,507 B2 * 7/2018 Zhang ................. G06F 17/5004

OTHER PUBLICATIONS

Benner J, Geiger A, Leinemann K. Flexible generation of semantic 3D building models. InProceedings of the 1st international workshop on next generation 3D city models, Bonn Jun. 21, 2005 (pp. 17-22).*

Zhang W, Wang H, Chen Y, Yan K, Chen M. 3D Building Roof Modeling by Optimizing Primitive's Parameters Using Constraints from LiDAR Data and Aerial Imagery. Remote Sensing. Sep. 1, 2005;6(9).*

(Continued)

*Primary Examiner* — Phu K Nguyen

(57) ABSTRACT

The present invention relates to a high-accuracy automatic 3D modeling method for complex buildings, comprising the steps of: transforming the complex building to a complex polygon by using the topological structure of polygons firstly, transforming complex polygons to a set of triangles which are seamlessly spliced by programming an algorithm and accomplishing high-accuracy automatic 3D modeling of buildings.

7 Claims, 46 Drawing Sheets

(56) References Cited

OTHER PUBLICATIONS

Wang Y, Xu H, Cheng L, Li M, Wang Y, Xia N, Chen Y, Tang Y. Three-Dimensional Reconstruction of Building Roofs from Airborne LiDAR Data Based on a Layer Connection and Smoothness Strategy. Remote Sensing. May 16, 2016;8(5):415.*

Uppsala Universitet, Geometric objects and transformations, Computer graphics—Class 5, Nov. 7, 2007; www.it.uu.se/edu/course/homepage/grafik1/ht07/schedule/class5.ppt.*

Xiaofei Xia, Generation of 3D Building Model by GIS, Thesis for Degree of Master in Engineering of Huazhong University of Science and Technology, May 11, 2006, Wuhan, China.

Xiaofei Xia et al., Semi-Automatic Generation of 3D Building Model Based on GIS Data, Computer & Digital Engineering, pp. 49-51, 2006, vol. 34, Issue 9.

Weili Ding et al., Automatic Modeling of Architecture and Infrared Simulation Based on OpenFlight API, Laser & Infrared, pp. 158-163, 2014, vol. 44, Issue 2.

Baoxuan Jin, Construction Method and Visualization Research of 3D City Model, Thesis for Degree of Master of Kunming University of Science and Technology, May 2002, Kunming, China.

\* cited by examiner

GIS data of a polygon          generating facades of a building (a) Marquee Tools      (b) plygon tool

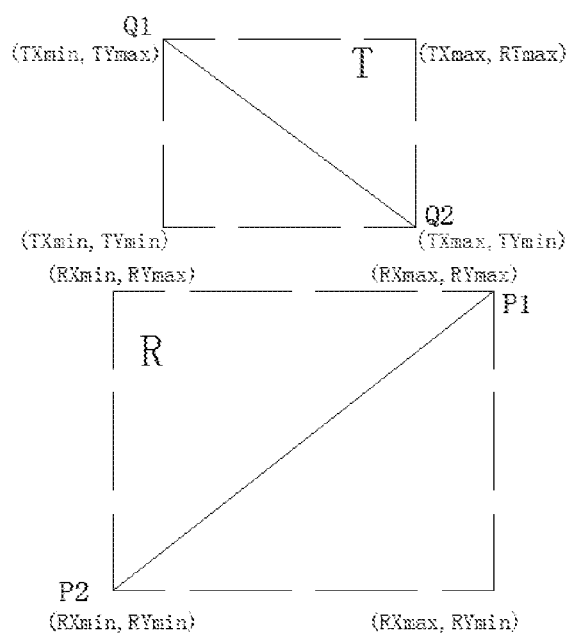
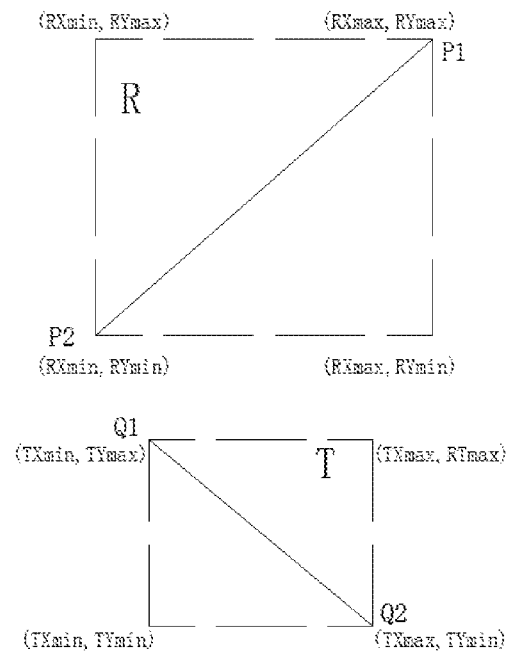
Figure 41     Figure 42
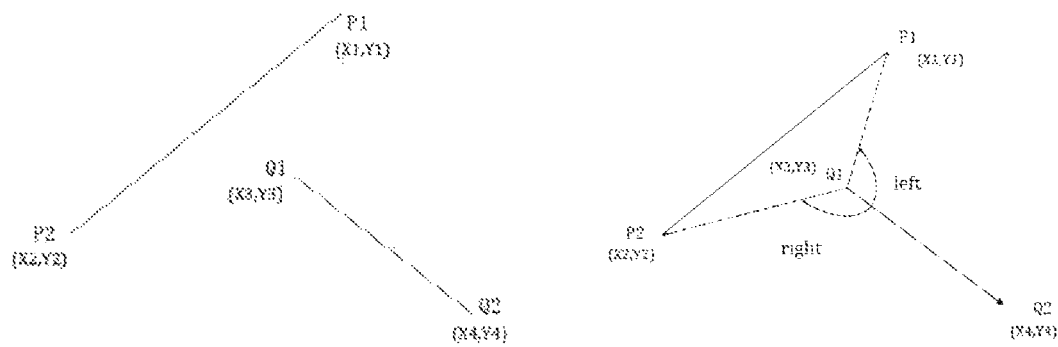
Figure 43

Figure 63A is devided into three parts: left, middle, right (a)

(b)

METHOD FOR AUTOMATIC MODELING OF COMPLEX BUILDINGS WITH HIGH ACCURACY

The present application claims the benefit of Chinese Patent Application No. 201610563422.9 filed on Jul. 19, 2016, the contents of which are hereby incorporated by reference.

FIELD OF THE INVENTION

The present disclosure relates to a method for three-dimensional (3D) modeling, in particular, to a high-accuracy automatic 3D modeling method for complex buildings.

BACKGROUND OF THE INVENTION

Generally, 3D modeling of complex buildings are accomplished by simplifying a complex polygon into simply polygons, but the 3D model generated in this method has poor accuracy of and fails in presenting details of buildings. Besides, a plenty of manual intervention is necessary. According to prior art, the boundaries of a building are extracted by using two dimensional (2D) data, and then the height properties of the building are read to generate the walls of the building, next, the roof is simplified in some degree and a 3D model of the roof is built, finally, the model is output to the 3D engine to perform rendering. Several methods of prior art are introduced as follows:

A solution is provided by Xiaofei, XIA based on his study on "3D modeling of buildings by using GIS (Geographic Information System)data" and "semi-automatic 3D modeling of buildings by using GIS data", which divides the process of modeling into main body modeling and roof modeling. As for the main body modeling, the facades of the mold of the building are generated by using polygon data and elevation data in the plane graph. In order to generate the facades, every boundary of polygons should be traversed, for any boundary of polygons, two vertexes corresponding to the elevation are created on the basis of elevation data thereof and then a quadrangular facade is formed, as shown in FIG. 1. According to the flow of roof modeling shown in FIG. 2, the modeling is accomplished by building a mathematical model according to the type and parameters of the roof inputted by users and transforming the roof into simple polygons. In the solution, the roof can be any of the following four types, i.e. gabled roofs, flat roofs, radial roofs and arbitrary curves-swept roofs.

The flow of the modeling of a gabled roof is as follows:
1) assigning a longest edge (Lmax) among all six edges of the gabled roof to be the direction of the length and beam of Box1 (P(1), P(6), P(3*b*), P(2)), as shown in FIG. 3;
2) selecting the longer edge between the two edges connecting to Lmax to be the length of Box2 (P(1*a*), P(2*a*), P(3), P(4)) and the shorter edge to be the width of Box 1 (W_Box 1), as shown in FIG. 3 where some auxiliary points are added wherein P (1*a*) denotes the intersection of the line segment P(4)P(5) and the vertical median line of Box 2; P (2*a*) denotes the intersection of the vertical median line of Box 2 and the line segment P(2)P(3); P(3*b*) denotes the intersection of the line segment P(5)P(2) and the line segment P(2)P(3);
3) assigning os with the result of L_box2 minus W_box1 to and assigning a=os/W_Box1, Box 2 being regarded as a sub roof when a is greater than 0.1 while Box 2 being regarded as an extension of the main roof when a is less than or equal to 0.1, as shown in FIG. 3*d*;
4) determining the relation between after the beam of the additional area and the beam of the main area after the division, if the shared line segment of the additional area and main area is parallel to the beam of the main area (i.e. the length of the rectangle of the main area), the beam of the additional area is perpendicular to the beam of the main area. If the shared line segment is perpendicular to the beam of the main area, the beam of the additional area is parallel to the beam of the main area;
5) generating a gabled roof for the rectangle where the main beam is located firstly after the division is completed, and then generating a roof for the rectangle where the auxiliary beam is located.

The flow of the modeling of a flat roof is as follows:
1) detecting the polygon inlay status in the boundary of the flat roof, i.e., the number of the polygons in the flat roof, and then storing information of the inlay status into a layered structure of linked lists;
2) traversing every polygon located in each polygon in this layer, in this manner, a whole layered structure of polygons of the roof is obtained;
3) assigning a height value to each polygon and a 3D model is generated as shown in FIG. 5.

The Flow of the Modeling of a Radial Roof

The modeling is accomplished by computing the gravity center of the boundary of the polygon and generating polygon facets according to the height value h of the top assigned by the user after the gravity center is acquired, and the procedures thereof are as follows:
1) computing the gravity center of the boundary of the polygon with the following formula:

$$x_c = \frac{1}{n}\sum_{i=1}^{n} x_i, \; y_c = \frac{1}{n}\sum_{i=1}^{n} y_i$$

2) determining the coordinates of the radial center of the gravity according to the height value of the top assigned by the user $T(x_c, y_c, h)$.
3) generating triangular facets in accordance with the point T and vertexes of the boundary, as shown in FIG. 6.

The flow of the modeling of an arbitrary curves-swept roof is as follows:
1) setting a start point and a end point to each curve, a width of the curved surface where the curves is located, and a sweep length of each curve.
2) generating polygon facets according to these attributions and then generating bodies by using these facets, such that the modeling is accomplished, as shown in FIGS. 7-8.

The generated roof and facades should be jointed to each other, the primary algorithm of which comprises recalculation of elevation values of key points. For the flat roof, the roof can be generated at the height of the generated facades directly, but for the irregular shaped roofs, such as dual-pitch roofs, mono-pitch roofs, domes, the elevation information of facades should be recalculated and the polygons of facades should be regenerated, as shown in FIGS. 9, 10, 11.

Weili, DING proposed an automatic modeling solution for buildings in her thesis named <Automatic modeling of building and infrared simulation based on OpenFlight API>, in which information of the shadows and topography extracted from high-resolution aerial photographs supplied by Google Earth and OpenFlight API is used, which comprise:
1. assuming that all buildings in the city have a structure of a flat roof and rectangular facades, and regions with flat terrain in the city locate in an identical plane. All the necessary parameters for the modeling of buildings can be acquired form aerial photographs, such as vertexes of polygons of the roof, height of buildings and so on;

2. selecting a polygon tool (as shown in FIG. 13) from the selection tool bar shown in FIG. 12 after the loading of the images from Google Earth, clicking and saving vertexes of polygons of the roof manually;

3. determining the height of buildings by using information of a plenty of shadows in the images;

4. mapping the aerial photographs supplied by Google Earth to the roofs as patterns, and accomplishing the modeling in the manner, as shown in FIG. 14.

Baoxuan, JIN proposed a method for constructing a building model by using a layered overlay method based on triangle division in his thesis named <Research on a method for constructing a 3D city model and visualization>. In 2D GIS, an object is represented by linking its geometrical information and its attribute information via interior identifiers. In view of the complexity of the 3D buildings, an indicator is supplemented to indicate the identifier of each layer, that is, a building is divided into several layers, generally two layers, and each layer is further divided into walls and roofs; if the building is more complex, it can be divided into three or more layers and each layer is further divided into walls and roofs; the layered model of a building is shown in FIG. 15. As demonstrated in FIG. 16, the polygon boundary of walls and roofs of a building is divided into triangles. If a wall or a roof of the building is a curved surface, a plurality of featured points should be gathered or inserted, and then a triangular mesh is formed inside the boundary of the polygon with a certain rule so as to realize the triangle division. After that, a 3D model is generated according to information of triangles.

Overall, the methods provided by prior art have poor accuracy of and fails in presenting details of buildings, such as patios, irregular buildings and so on. Furthermore, they also need a plenty of manual intervention, for example, in the research of Xiaofei, XIA, "3D modeling of buildings by using data of GIS", several auxiliary points are needed when processing the roof, information of buildings needs to be extracted from Google Earth manually in the research on <Automatic modeling of building and infrared simulation based on OpenFlight API> by Weili, DING, and auxiliary points is necessary for triangle division in <research on methods for constructing a 3D city model and visualization> by Baoxuan, JIN. The reasons for the need of manual intervention are as follows:

1. All the solutions tend to accomplish the modeling by transforming the complex buildings to simple and regular shapes, that is, simplifying complex polygons to simple ones, which certainly leads to a loss of information of buildings, a failure of detail presentation and low accuracy.

2. Modeling of some complex buildings is unable to be accomplished because fitting simple polygons to them is very hard.

3. In the point of view of mathematics, the shapes of a building is composed of many line segments. If a building comprises both arcs and straight lines, different mathematical models should be set for them respectively. If division is to be performed, human decision is necessary to find out the dividing points between the arcs and straight lines so as to ensure the accuracy of division. Therefore, the modeling of above methods is inefficient due to the need of a plenty of manual intervention.

In conclusion, a solution for modeling complex buildings is in great desire so as to overcome the defects such as low accuracy and inefficiency above.

SUMMARY OF THE INVENTION

In order to solve the above problems, the present invention provides a high-accuracy automatic 3D modeling method for complex buildings, which comprises the steps of:
reading and preprocessing data of a building;
extracting information for modeling from the preprocessed data; and
modeling a main body and a roof of the building by using the information for modeling acquired in the extracting step;
wherein the main body of the building is modeled based on plane coordinates and elevation data of a boundary of the building acquired from the information for modeling;
wherein an order in which nodes of the boundary of the building are plotted in the information for modeling is rearranged and then input to a 3D engine for modeling;
wherein the roof is modeled by determining the shape of the roof based on the plane coordinates of the boundary of the roof acquired from the information for modeling, processing the boundary of the roof based on the determination, and modeling the roof based on the shape of the roof and the elevation data without addition of nodes of the boundary.

Further, in the reading and preprocessing step, the data of the building are acquired by reading a file containing the data of the building with specific software; the preprocessing involves checking topology, merging adjacent points, normalizing object attributes and assigning elevation values over the data of the building.

Further, in the extracting step, the information for modeling includes information of 3D coordinates of nodes of exterior and interior boundaries of the building, and elevation information of the building.

Further, the information for modeling acquired in the extracting step are stored in a form of binary file.

Further, the modeling of the main body of the building comprises the steps of:
identifying an exterior boundary of the main body of the building;
successively reading 3D coordinates of two adjacent nodes on the exterior boundary and elevation data of the building corresponding to the nodes;
generating two new nodes based on the plane coordinates of the two adjacent nodes and respective elevation data thereof;
forming two triangles after the generated two new nodes and the two adjacent nodes are numbered anticlockwise;
splicing the two triangles seamlessly to obtain a side of the building; and
traversing other nodes on the exterior boundary of the building and repeating the above steps to acquire information for modeling of the main body of the building.

Further, the modeling of the roof of the building comprises the following steps:
identifying the roof boundary of the building;
determining whether the boundary of the roof of the building is a simple polygon or a complex polygon; and
if the boundary of the roof of the building is a simple polygon, automatically dividing the simple polygon into a plurality of triangles by using a method for simple polygon division to acquire information for modeling the roof; or
if the roof boundary of the building is a complex polygon, dividing the complex polygon into a plurality of simple polygons by using the method for complex polygon division and then acquiring information for modeling the roof by using a method for simple polygon division of the above step.

Further, the method for simple polygon division comprises the following steps:
determining whether the number of nodes of the simple polygon is three;
if yes, indicating that the polygon is a triangle, inputting the information for modeling the triangle to 3D engine;
Otherwise, traversing all the nodes of the simple polygon;
selecting any two non-collinear nodes on the exterior boundary of the simple polygon;
connecting these two non-collinear nodes if a straight line connecting the two non-collinear nodes: (i) does not intersect with the exterior boundary, and (ii) has a midpoint located within the polygon, otherwise traversing another pair of non-collinear nodes on the simple polygon until two non-collinear nodes that meet the requirements of (i) and (ii) are found out;
dividing the polygon into two parts by the straight line connecting the two non-collinear nodes to obtain two new simple polygons;
repeating the above steps to divide the new polygons until the number of nodes of each of resulting simple polygons is three.

Further, the method for complex polygon division comprises the following steps:
simplifying the exterior boundary of the complex polygon and dividing the complex polygon into a plurality of simple polygons without changing the information for modeling the interior boundary of the complex polygon;
combining the interior and the exterior boundaries of the simplified polygon by a straight line connecting them to obtain simple polygons without the interior boundary; and dividing the simple polygon into a plurality of triangles by using the method for simple polygon division to acquire information for modeling.

Further, wherein, simplifying the exterior boundary of the complex polygon comprises the following steps:
inputting information for modeling the complex polygon;
determining whether the number of nodes on the exterior boundary of the complex polygon is three;
if yes, removing the interior boundary from the complex polygon;
otherwise, traversing all the nodes on the exterior boundary;
selecting any two non-collinear nodes on the exterior boundary of the complex polygon;
connecting these two non-collinear nodes if a straight line connecting the two non-collinear nodes: (i) has a midpoint located within the polygon, (ii) does not intersect with the exterior boundary of the complex polygon, and (iii) does not intersect with the interior boundary of the complex polygon;
otherwise traversing other pair of non-collinear nodes on the complex polygon until there are two non-collinear nodes that meet the requirements of (i), (ii) and (iii); and if there is no pair of nodes that meet the requirements of (i), (ii) and (iii) after traversing all the nodes on the exterior boundary, removing the interior boundary from the complex polygon;
dividing the exterior boundary of the complex polygon into two parts by the straight line connecting the two non-collinear nodes;
traversing all the nodes on the interior boundary of the polygon and determining which part of two parts the nodes are located in;
rearranging all the nodes according to their positions on the interior boundary to form two new polygons;
determining whether the two new polygons contain an interior boundary; and if so, continuing to perform the above method for simplifying the exterior boundary of the complex polygon;
continuing to perform the method for simple polygon division if there is no interior boundary which indicates that the new polygon is a simple polygon.

Further, wherein, the method for removing the interior boundary of the complex polygon comprises the following steps:
selecting any one of the nodes on the exterior boundary of the complex polygon;
traversing all the nodes on the interior boundary of the complex polygon to find out a node closest to the selected node on the exterior boundary;
if a straight line connecting the two nodes: (i) does not intersect with the exterior boundary of the complex polygon, and (ii) does not intersect with the interior boundary of the complex polygon, connecting these two nodes; otherwise traversing all the nodes on the interior boundary until nodes that meet the requirements of (i) and (ii) are founded out;
combining the interior and the exterior boundaries of the complex polygon by the straight line connecting them into a new exterior boundary;
rearranging all the nodes of the complex polygon to form a new complex polygon;
determining whether the new polygon contains an interior boundary;
if yes, indicating that the new polygon is a complex polygon, simplifying the exterior boundary of the new complex polygon;
otherwise, indicating that the new polygon is a simple polygon, dividing the new polygon by using the method for simple polygon division.

Further, in the modeling of the roof of the building, when elevation data of the building are different, the building is layered based on different elevation values, and each layer is modeled respectively.

The present invention provides the following benefits:
(i) a wide applicable range:
buildings having irregular structures, even some special structures such as a patio, can be modeled with this method which has taken a variety of buildings in the real world into consideration;
(ii) high accuracy:
the polygons are processed, by programming algorithm, as a set of a plurality of triangles which are spliced seamlessly to model the complex buildings with high accuracy, while the detailed features of the buildings are maintained; and
(iii) high efficiency:
topology of data of the buildings is reconfigured by programming algorithm, then directly processed as a cluster of plurality of triangles which are spliced seamlessly and output to 3D engine to model the buildings without manual intervention or addition of auxiliary point, which reduces determining time and the number of surfaces to be rendered and improves the automation and rendering efficiency of modeling significantly. Furthermore, the present invention allows for a large amount of data to be read at a time and to be modeled, thus significantly improving the efficiency of modeling.

BRIEF DESCRIPTION OF DRAWINGS

FIGS. 40-46 are schematic diagrams showing the determination on whether the node locates in the polygon.

DETAILED DESCRIPTION OF PREFERRED EMBODIMENTS

In order to demonstrate the objective, technical solutions and advantages of the present invention more clearly, embodiments are described in detail hereinafter with reference to accompanying drawings. However, it is obvious for the skilled in the art that the embodiments and drawings should not be taken as any limit on the invention.

First of all, the technical terms appearing in the present invention are defined as follows so as to clarify the description of the present invention.

1. Simple Polygons

In mathematics, a polygon is a closed plane figure made of three or more positions in coordinate system named as vertexes and edges that links these vertexes sequentially. In geometry, edges of a polygon do not have any other common points but endpoints. Therefore, based on the definition above, all the vertexes of a polygon are on a single plane and the edges do not intersect with each other than at these vertexes. A polygon having no edge intersecting other edges is named as a standard polygon or a simple polygon.

2. Complex Polygons

Figure 1:
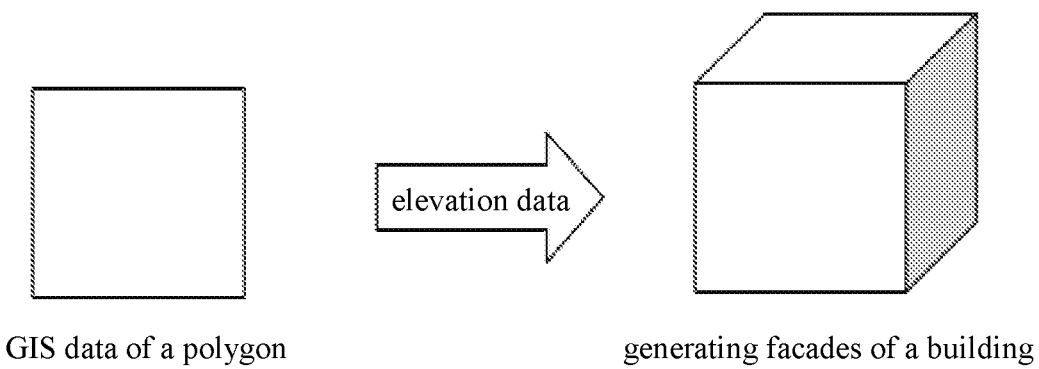
FIGS. 1-17 are schematic diagrams of the modeling method of prior art.
Figure 2:
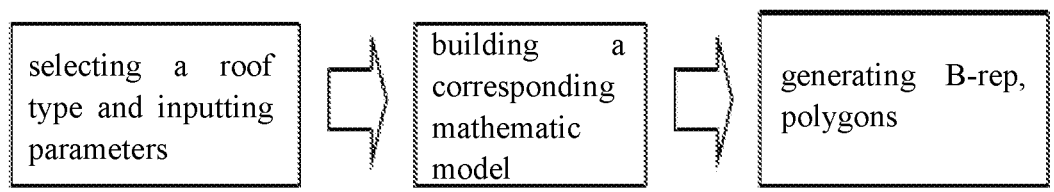
Figure 3:
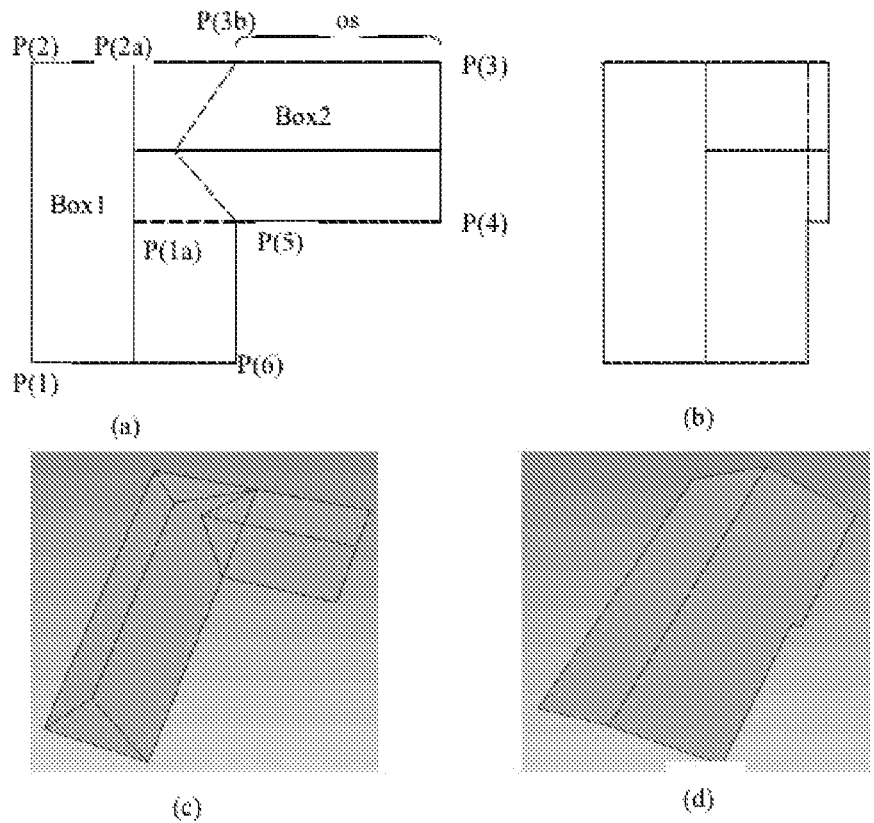
Figure 4:
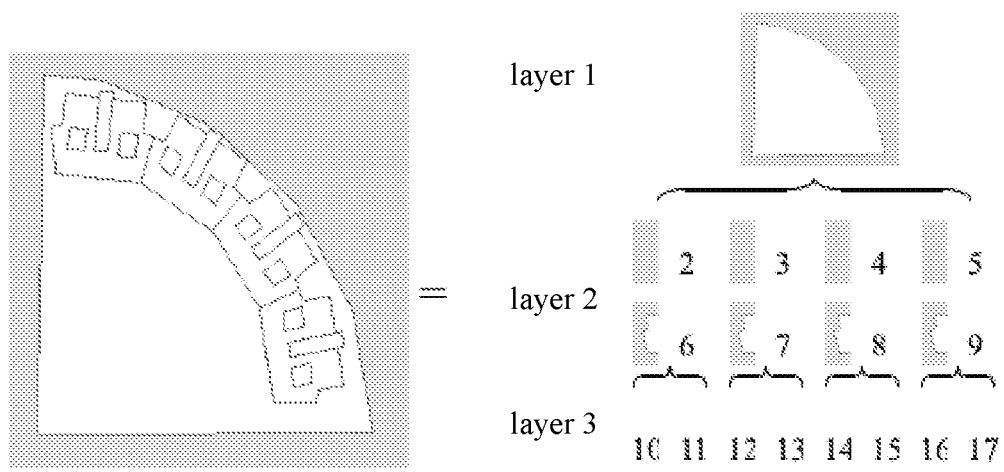
Figure 5:
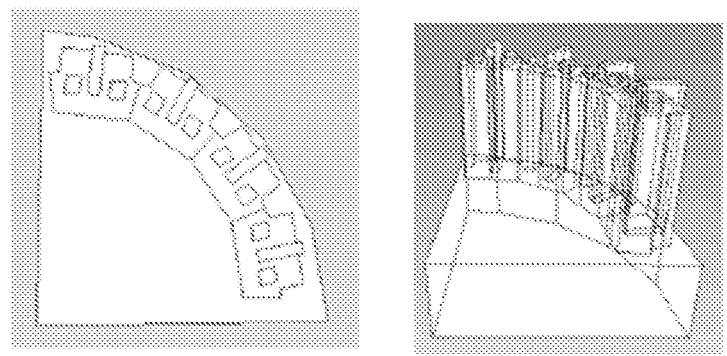
Figure 6:
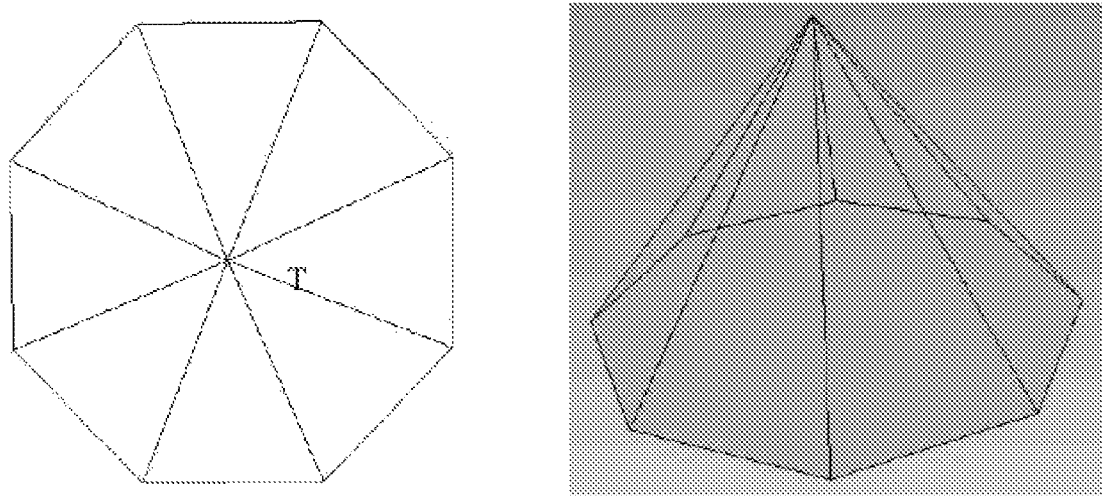
Figure 7:
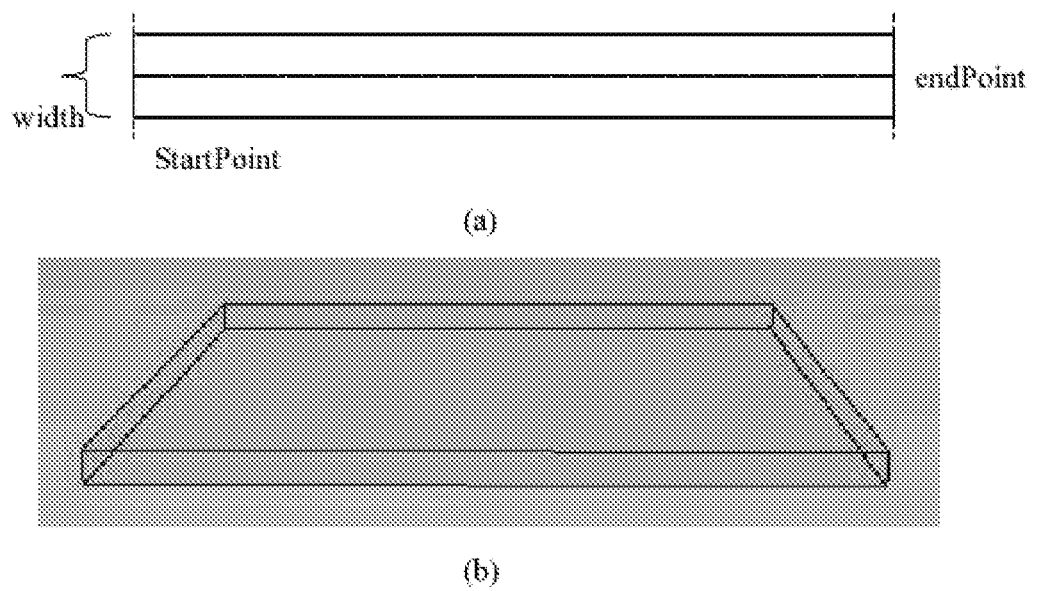
Figure 8:
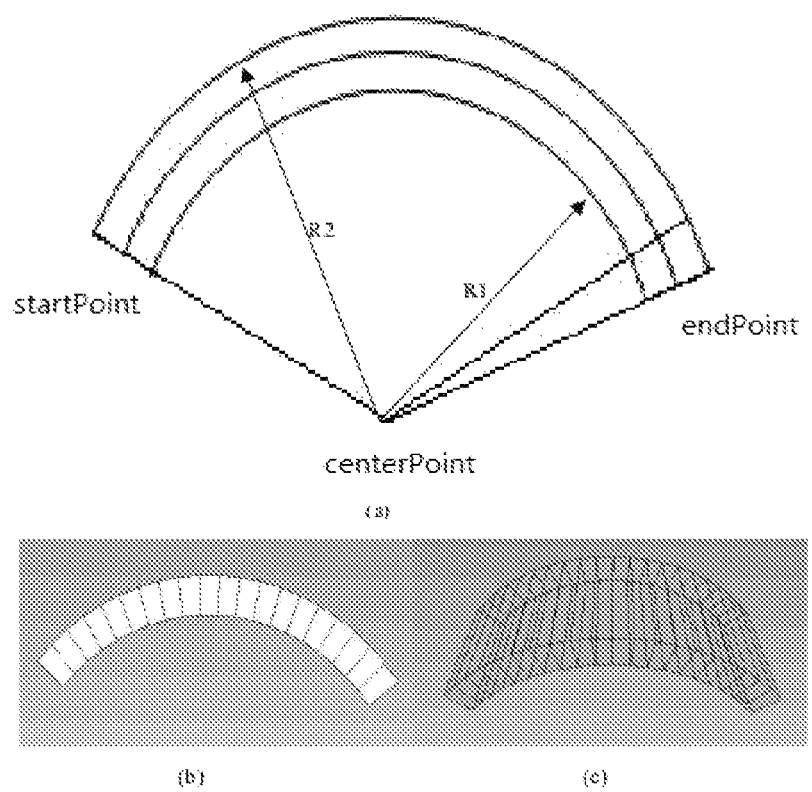
Figure 9:
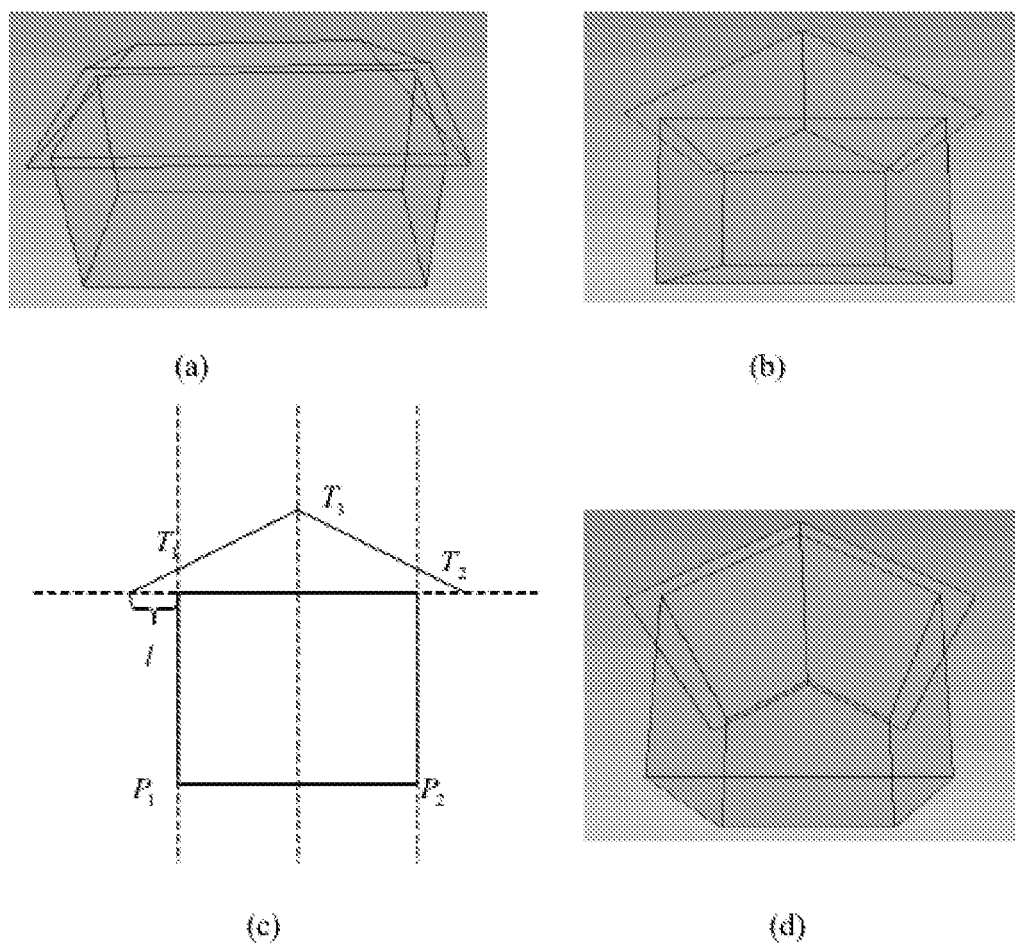
Figure 10:
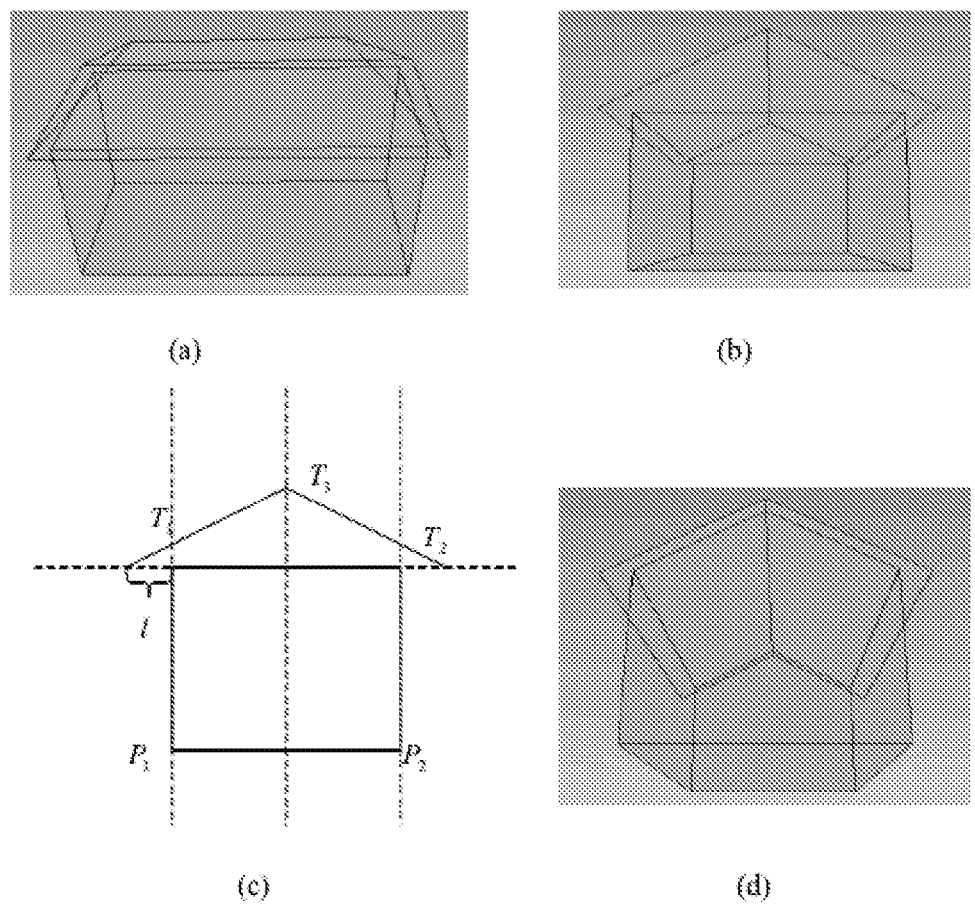
Figure 11:
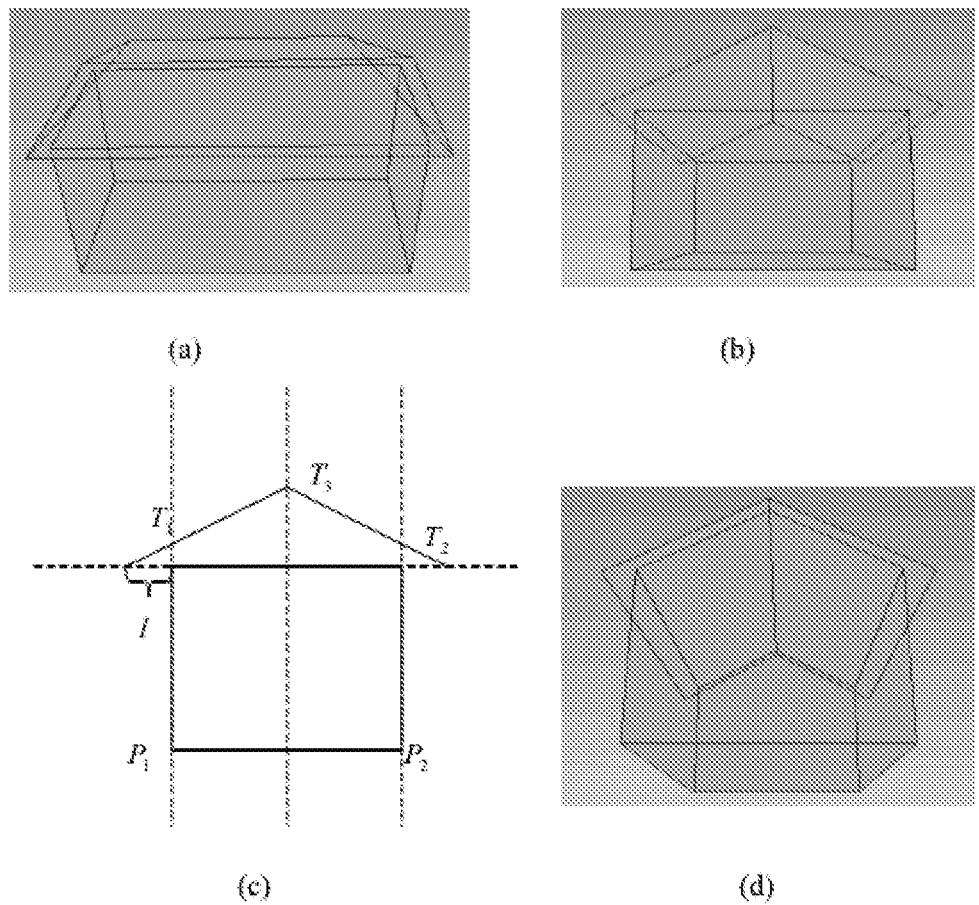
Figure 12:
Figure 13:
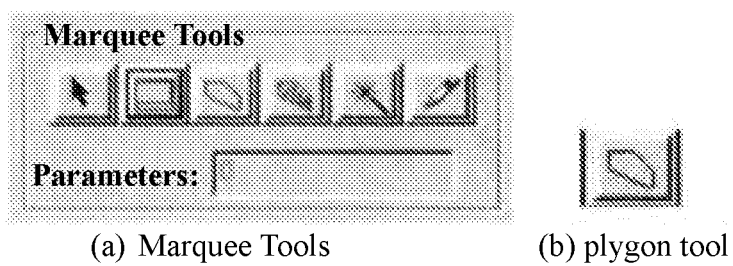
Figure 14:
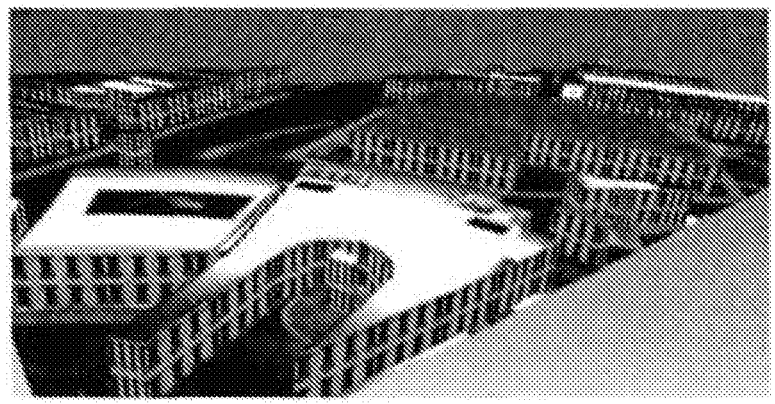
Figure 15:
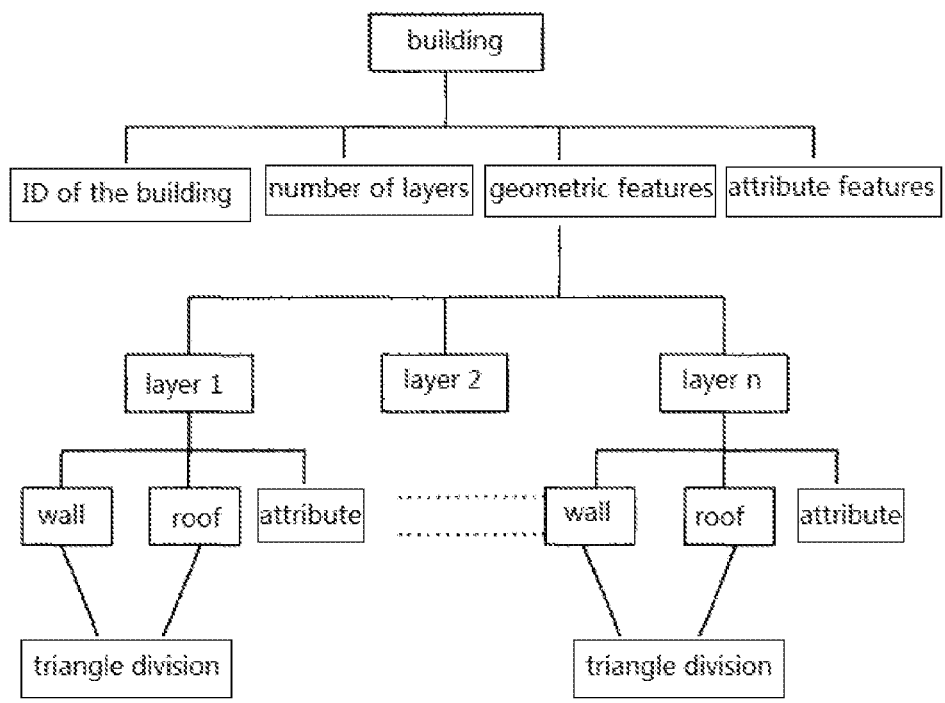
Figure 16:
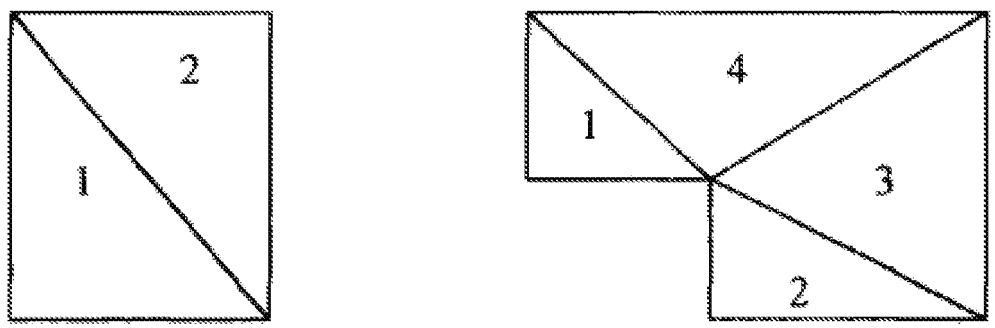
Figure 17:
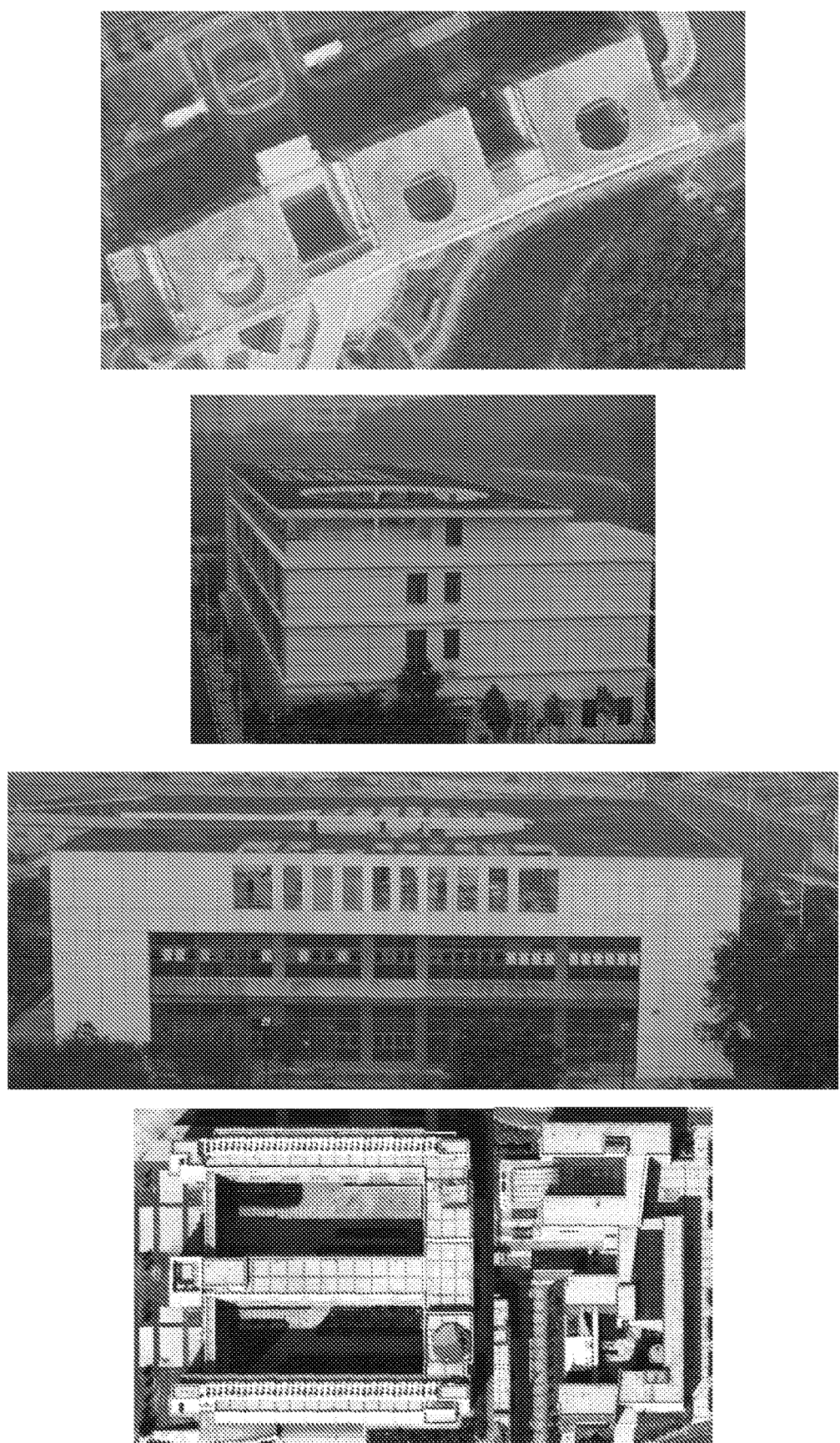
Figure 18:
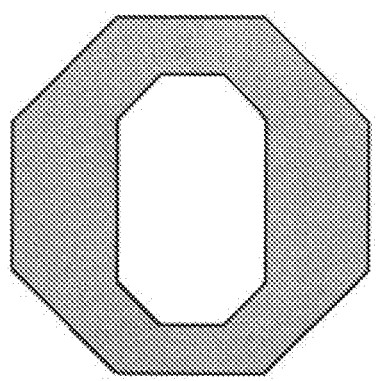
FIGS. 18-21 are schematic diagrams of a complex polygon, a convex polygon and a concave polygon and nodes of a polygon.

A simple polygon can be described by a single set of vertexes, but if a polygon comprises at least one simple polygon in its interior, such as a hole shown in FIG. 18, multiple sets of vertexes are needed for the description of it. If description of a polygon needs at least two sets of vertexes, it is a complex polygon.

3. Convexity and Concavity

Figure 19:
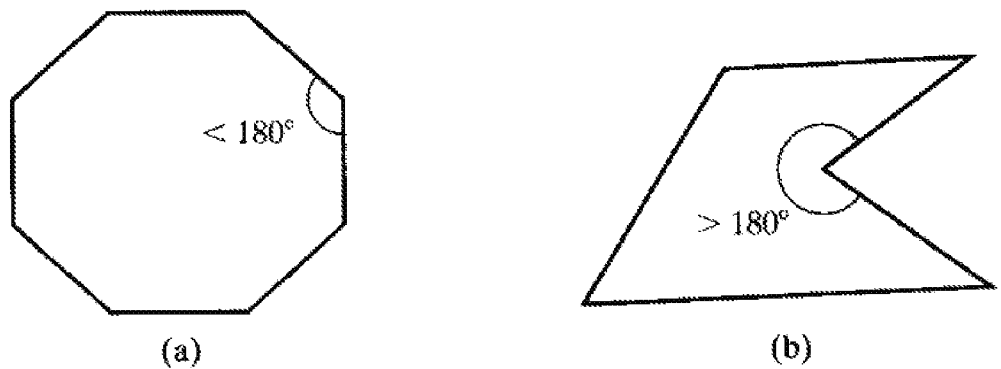

An interior angle is an angle formed by two adjacent edges of the polygon and being inside the boundary thereof. If all interior angles of a polygon are less than 180°, the polygon is a convex polygon, as shown in FIG. 19(*a*). Otherwise, a polygon is a concave polygon as long as one interior angle thereof is more than 180°.

4. Topology

Spatial data like points, lines, polygons and so on are all denoted in the form of a set of points, relations such as adjacent, relevant, inclusive, connected and so on are topologies of spatial data.

1) Topology of Simple Polygons

Figure 20:
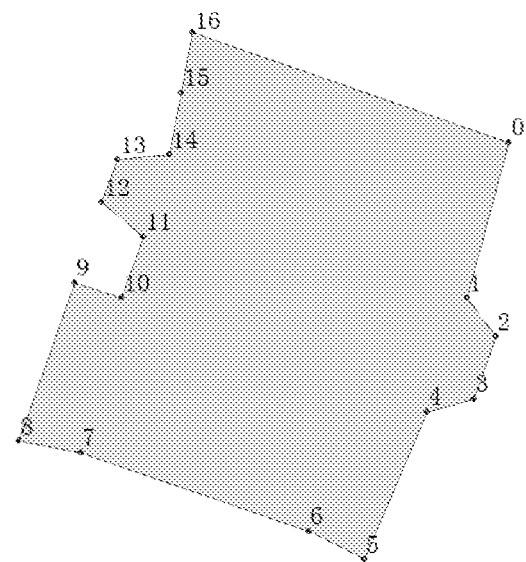

A polygon is formed by connecting a plurality of ordered points sequentially. Nodes of a simple polygon are sequentially connected clockwise. As shown in FIG. 20, 17 nodes are sequentially connected clockwise, wherein node 0 is the first one and node 1 is the next, all the way through node 16, the last one.

2) Topology of Complex Polygons

Figure 21:
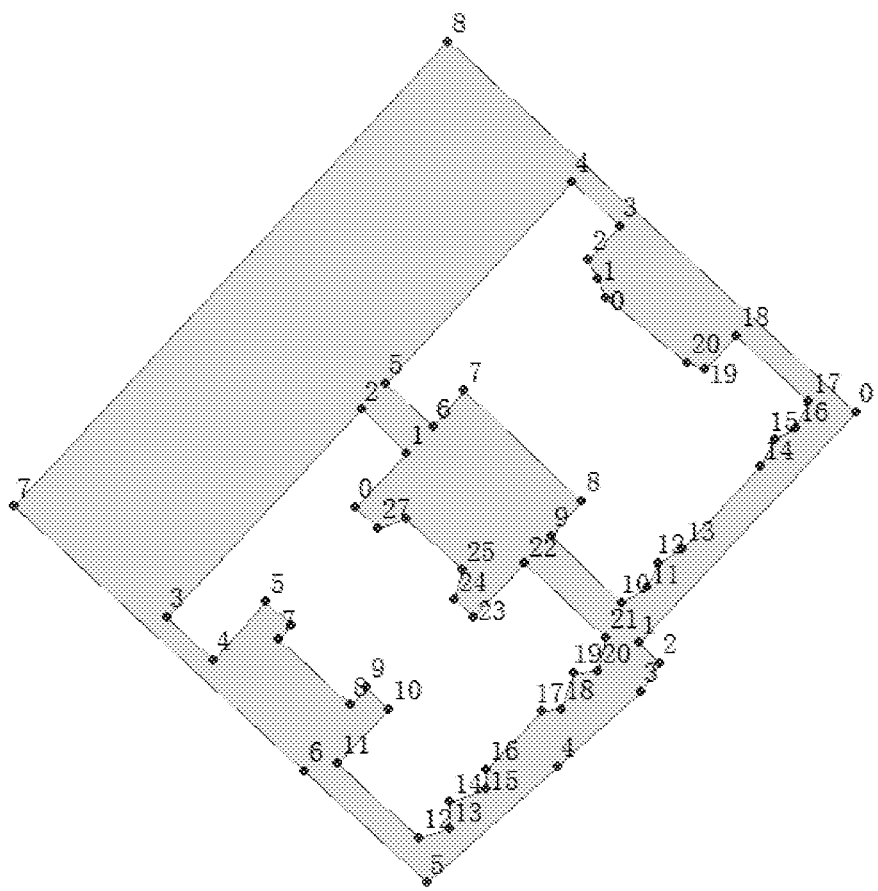

Likewise, nodes of the exterior boundary of a complex polygon are sequentially connected clockwise, but nodes of the interior boundary are sequentially connected anticlockwise. As shown in FIG. 21, the complex polygon is composed by three following sets of points: an exterior boundary formed by sequentially connecting 9 nodes clockwise, node 0 is the first one and node 1 is the next, all the way through node 8, the last one; an interior boundary at the bottom left formed by sequentially connecting 28 nodes anticlockwise, node 0 is the first one and node 1 is the next, all the way through node 27, the last one; an interior boundary at the top left formed by sequentially connecting 21 nodes anticlockwise, node 0 is the first one and node 1 is the next, all the way through node 20, the last one.

Therefore, when traversing these nodes of either the exterior or interior boundary of the complex polygon in the connecting order, the interior part of the polygon is on the right and the exterior of it is on the left.

5. Envelop Object

Figure 22:
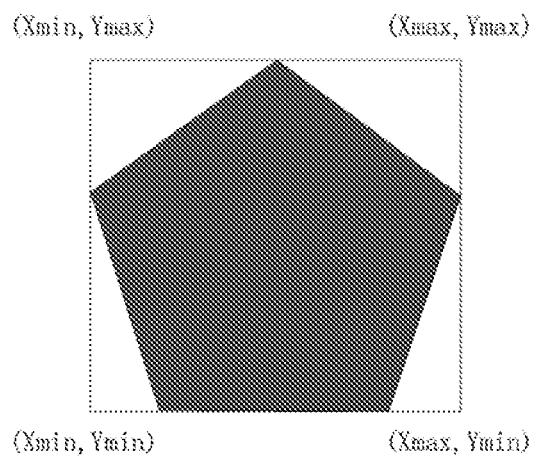
FIG. 22 is a schematic diagram of an envelope object of the present invention.

In the present invention, each spatial element corresponds to an envelop object. The envelop object defines a spatial region for each spatial element and it is a minimal circumscribed rectangle of each element composed by four points such as (Xmin, Ymax), (Xmax, Ymax), (Xmin, Ymin), (Xmax, Ymin). An envelop object of a polygon is illustrated as FIG. 22.

6. Division of Polygons

Figure 23:
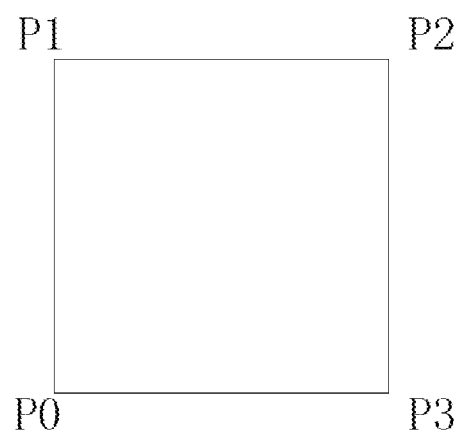
FIGS. 23-25 are schematic diagrams showing division of polygons of the present invention.
Figure 24:
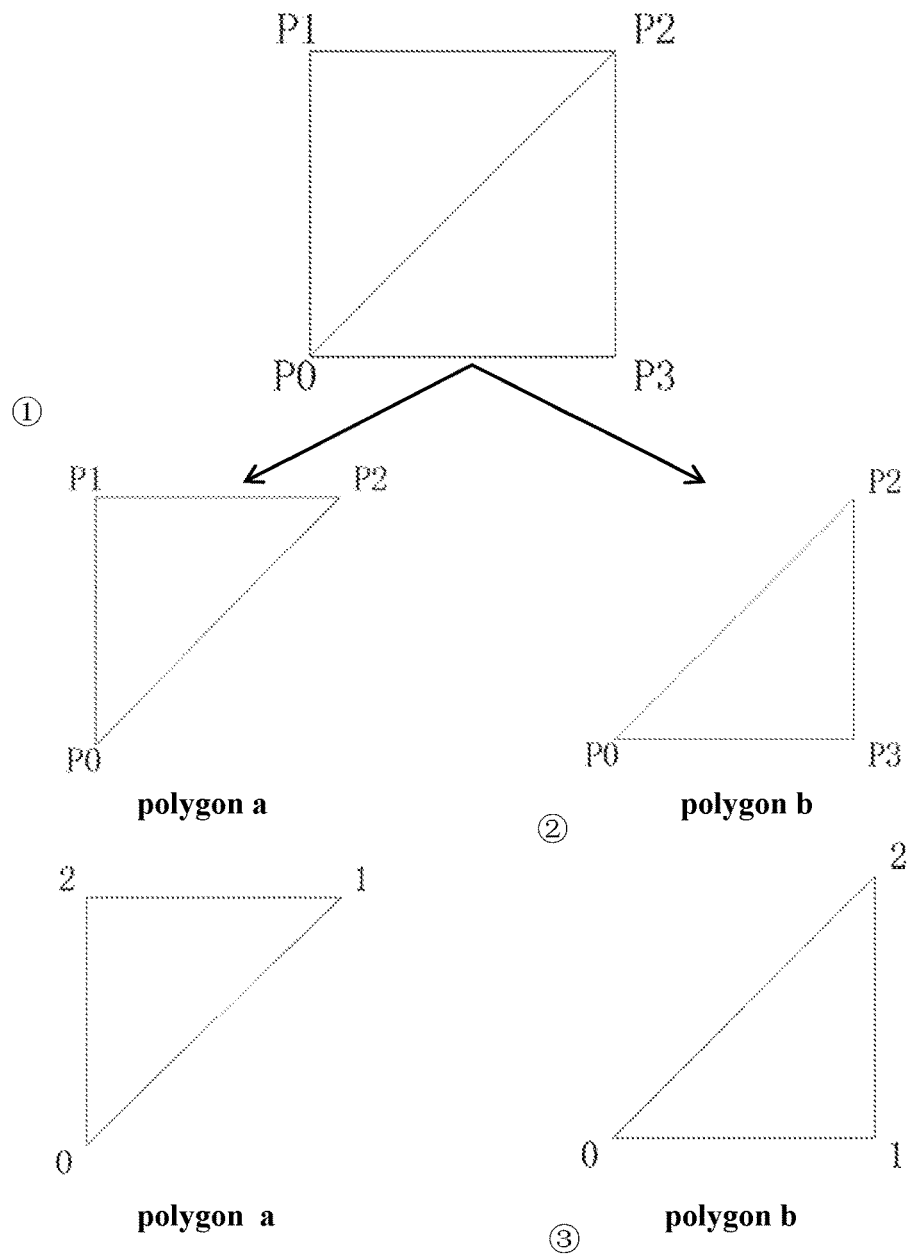
Figure 25:
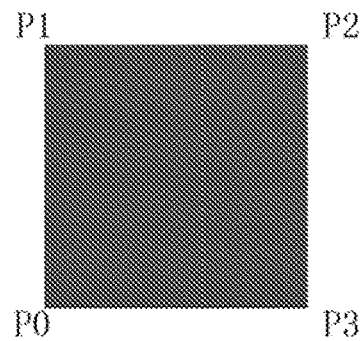
Figure 26:
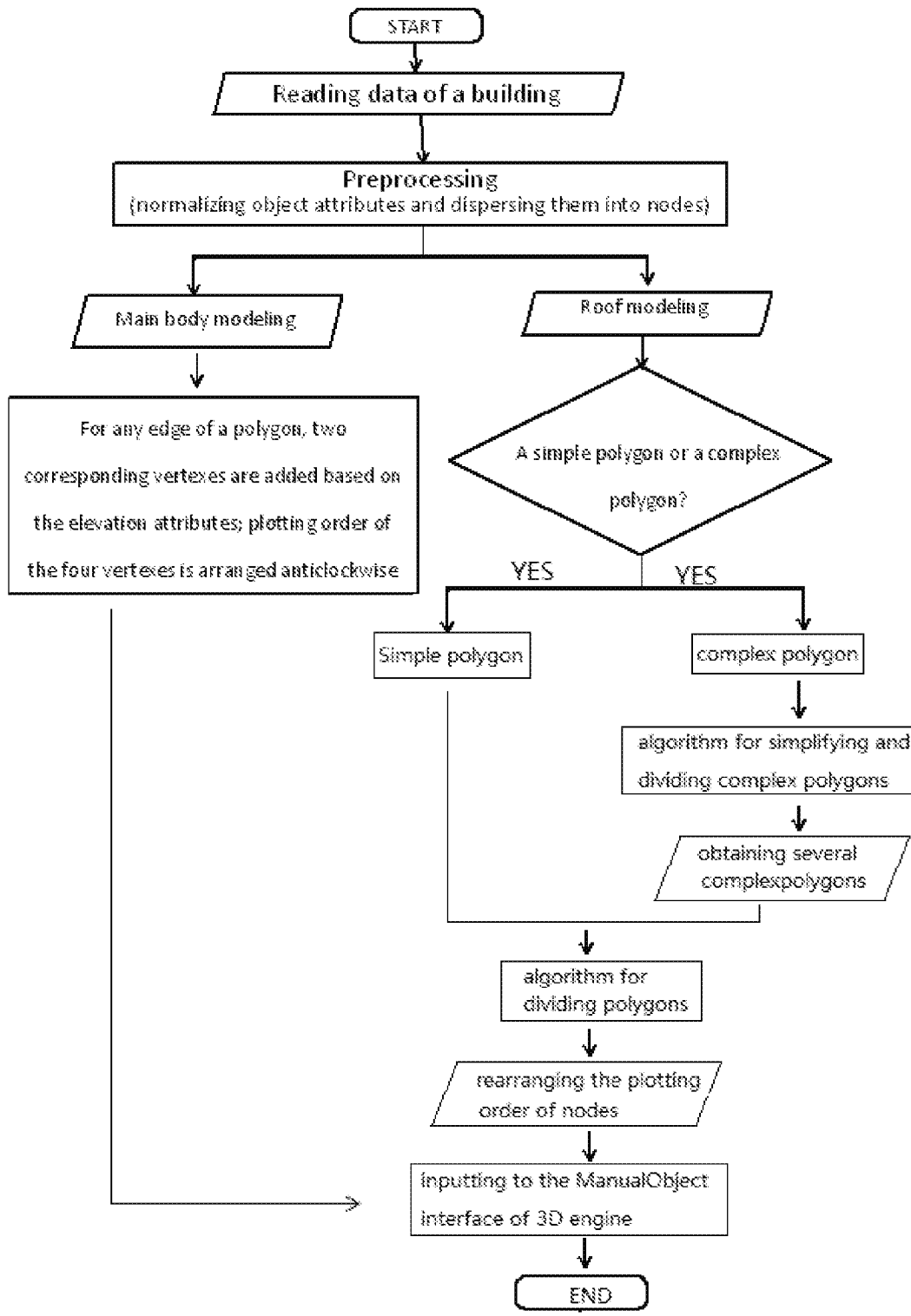
FIG. 26 shows the modeling process of the present invention.

All existing 3D engining is developed based on OpenGL and Direct X, and polygons drawn by both of which are sets of triangles, so polygons should be transformed to a set of triangles so as to be drawn and output. Moreover, both of OpenGL and Direct X stipulates that a polygon is represented in an anticlockwise direction when seeing from the exterior of the polygon, so nodes of triangles should be renumbered anticlockwise. The division of a polygon is shown as follows by taking the polygon in FIG. 23 as an example:

①. connecting points P0 and P2 in accordance with a certain rule;

②. dividing the polygon into two new polygons along the line segment connecting points P0 and P2, i.e., polygon a and polygon b;

③. if the polygons after division are triangles, renumbering nodes of each polygon anticlockwise from 0 and inputting these polygons to 3D engine. FIG. 25 shows the representation of the polygon.

7. Data Format

Basic data of the present invention includes mainly large-scale topographic maps, architecture blueprint, working drawings, as-built drawings and so on, data format of them are Shapefile, Coverage, DWG and DXF.

After the definition of technical terms above, the solution of present invention is describer in detail hereinafter.

1. Reading and Preprocessing Data of a Building

Data of buildings, such as Shapefile file, are read and preprocessed by using the software ArcGIS.

Figure 27:
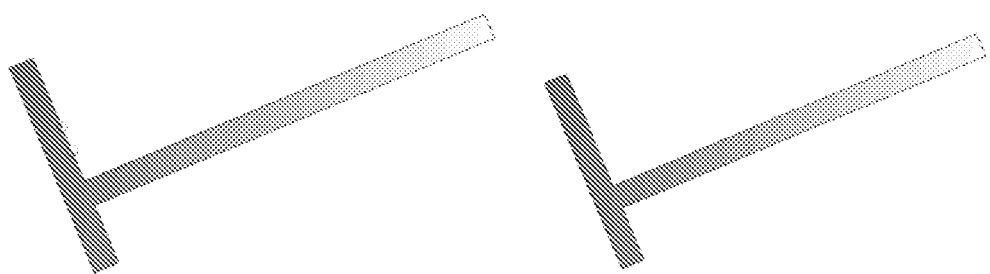
FIGS. 27-28 are schematic diagrams of the topology check on polygons of the present invention.
Figure 28:
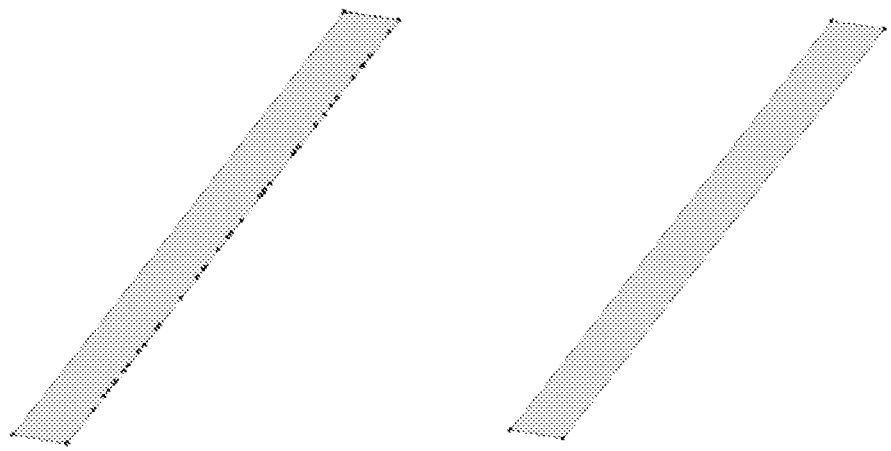

The preprocessing comprises topology check so as to ensure the accuracy and integrity of data, such as checking whether the polygon is closed and whether unnecessary nodes are on the line segments and so on. As shown in FIG. 27, the unclosed polygon is changed to be closed, and unnecessary nodes are deleted as shown in FIG. 28.

2. Extracting Information for Modeling from the Data of the Building

1) Extracting 3D spatial information of the building

The information for modeling includes information of exterior and interior boundaries and height of the building, etc., such as 3D coordinates of the nodes on the boundaries and the topology of the polygon, the information can be obtained from the Shapefile file storing the date of the building.

If the boundary of the building is a simple polygon, the data structure of the nodes on which is shown in chart 3, wherein "Number of polygon" denotes the number of the building containing the nodes, "Number of node" denotes the connecting order of a node, "X coordinate" denotes the X coordinate of a node, "Y coordinate" denotes the Y coordinate of a node, and "Z coordinate" denotes the Z coordinate of a node.

Chart 3

Figure 29:
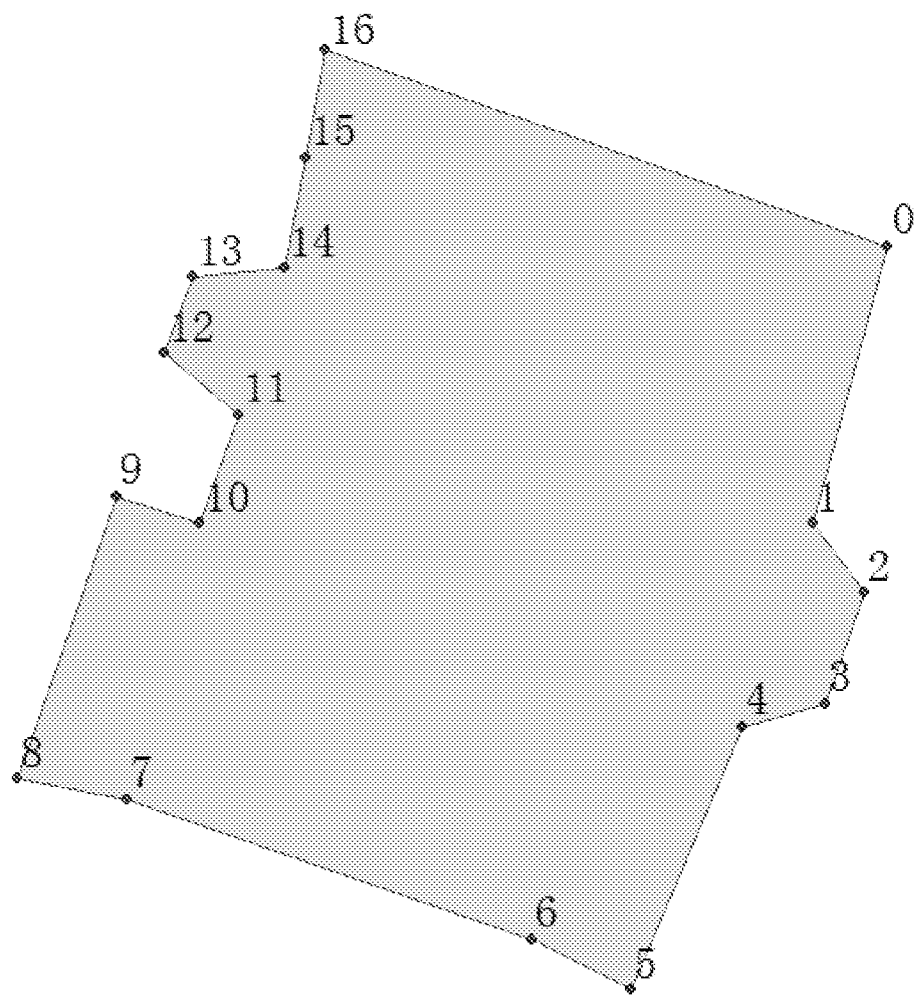
FIGS. 29-30 are schematic diagrams of the boundary nodes of simple polygons and complex polygons.
Figure 30:
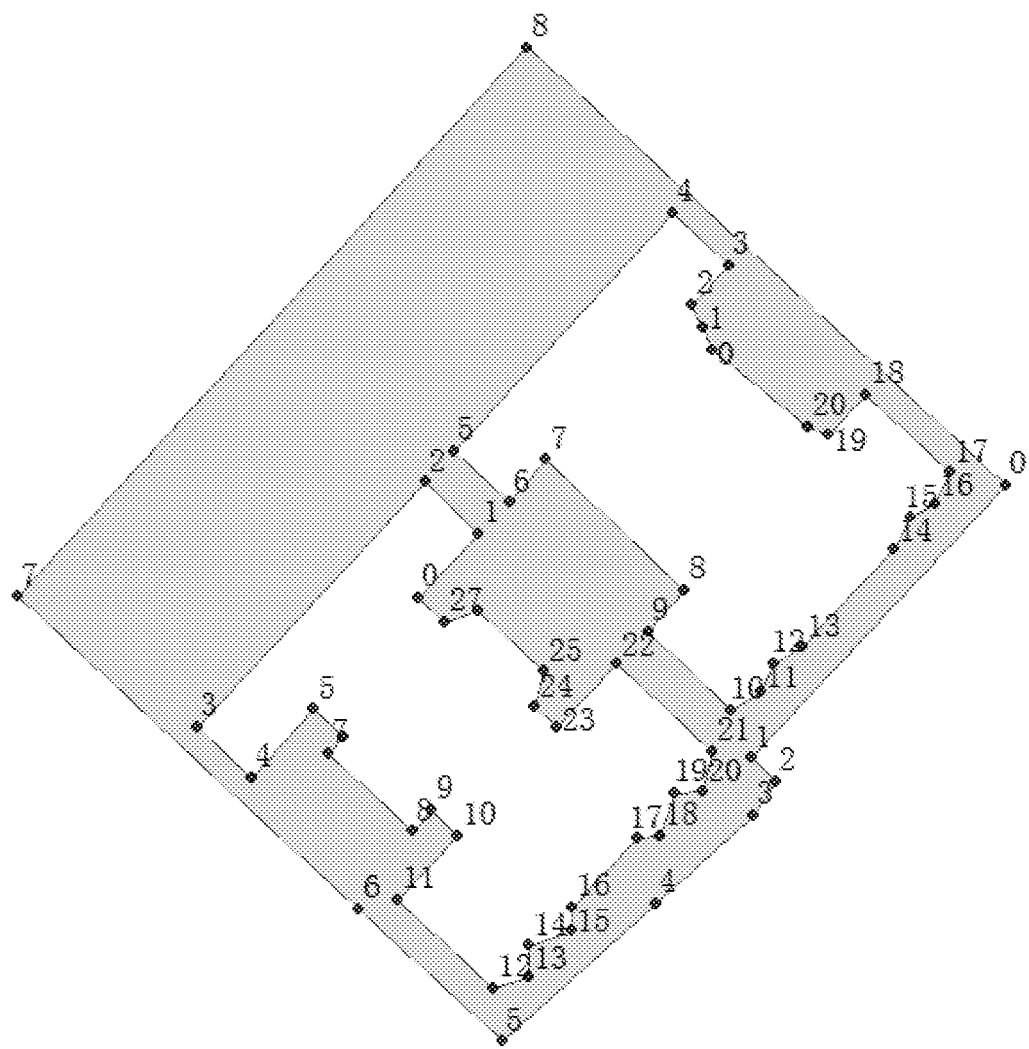

List of data of the nodes on the boundary of the simple polygon in FIG. 29

| Number of polygon | Number of node | X coordinate | Y coordinate | Z coordinate |
|---|---|---|---|---|
| 72 | 0 | 762730.549 | 2457311.199 | 5.150 |
| 72 | 1 | 762727.927 | 2457301.511 | 4.855 |
| 72 | 2 | 762729.706 | 2457299.100 | 4.855 |
| 72 | 3 | 762728.354 | 2457295.208 | 4.855 |
| 72 | 4 | 762725.433 | 2457294.431 | 4.640 |
| 72 | 5 | 762721.529 | 2457285.198 | 4.600 |
| 72 | 6 | 762718.054 | 2457286.994 | 4.600 |
| 72 | 7 | 762703.864 | 2457291.874 | 4.400 |
| 72 | 8 | 762700.023 | 2457292.594 | 4.400 |
| 72 | 9 | 762703.480 | 2457302.494 | 4.400 |
| 72 | 10 | 762706.432 | 2457301.523 | 4.600 |
| 72 | 11 | 762707.785 | 2457305.328 | 4.600 |
| 72 | 12 | 762705.205 | 2457307.459 | 4.400 |
| 72 | 13 | 762706.168 | 2457310.137 | 4.400 |
| 72 | 14 | 762709.405 | 2457310.451 | 4.600 |
| 72 | 15 | 762710.153 | 2457314.311 | 4.667 |
| 72 | 16 | 762710.841 | 2457318.057 | 4.667 |

If the boundary of a building is a complex polygon, the data structure of the nodes on the boundary are listed in chart (4) which comprises three segments of boundary wherein a first segment is an exterior boundary having 9 nodes, a second segment having 21 nodes and a third segment having 28 nodes are interior nodes.

Chart 4

List of data of nodes on the boundaries of the complex polygon in figure

| Number of polygon | Number of node | X coordinate | Y coordinate | Z coordinate |
|---|---|---|---|---|
| 162 | 0 | 762763.670 | 2457477.327 | 4.850 |
| 162 | 1 | 762745.575 | 2457458.022 | 4.650 |
| 162 | 2 | 762747.341 | 2457456.399 | 4.850 |
| 162 | 3 | 762745.754 | 2457453.977 | 5.050 |
| 162 | 4 | 762738.831 | 2457447.763 | 4.950 |
| 162 | 5 | 762727.896 | 2457437.948 | 4.950 |
| 162 | 6 | 762717.759 | 2457447.295 | 4.850 |
| 162 | 7 | 762693.543 | 2457469.445 | 4.950 |
| 162 | 8 | 762729.722 | 2457508.355 | 4.850 |
| 162 | 0 | 762742.878 | 2457486.915 | 4.850 |
| 162 | 1 | 762742.186 | 2457488.447 | 4.850 |
| 162 | 2 | 762741.384 | 2457490.107 | 4.850 |
| 162 | 3 | 762743.976 | 2457492.917 | 4.650 |
| 162 | 4 | 762739.970 | 2457496.614 | 4.650 |
| 162 | 5 | 762724.428 | 2457479.793 | 4.650 |
| 162 | 6 | 762728.408 | 2457476.096 | 4.650 |
| 162 | 7 | 762731.026 | 2457479.171 | 4.650 |
| 162 | 8 | 762740.891 | 2457469.905 | 4.547 |
| 162 | 9 | 762738.270 | 2457466.966 | 4.547 |
| 162 | 10 | 762744.190 | 2457461.440 | 4.547 |
| 162 | 11 | 762746.295 | 2457462.777 | 4.547 |
| 162 | 12 | 762747.165 | 2457464.696 | 4.547 |
| 162 | 13 | 762749.138 | 2457465.868 | 4.650 |
| 162 | 14 | 762755.696 | 2457472.865 | 4.650 |
| 162 | 15 | 762756.858 | 2457475.021 | 4.650 |
| 162 | 16 | 762758.589 | 2457475.964 | 4.650 |
| 162 | 17 | 762759.752 | 2457478.215 | 4.850 |
| 162 | 18 | 762753.765 | 2457483.766 | 4.850 |
| 162 | 19 | 762751.049 | 2457480.879 | 4.358 |
| 162 | 20 | 762749.610 | 2457481.466 | 4.358 |
| 162 | 0 | 762721.974 | 2457469.347 | 4.358 |
| 162 | 1 | 762726.276 | 2457473.914 | 4.358 |
| 162 | 2 | 762722.456 | 2457477.567 | 4.250 |
| 162 | 3 | 762706.250 | 2457460.212 | 4.850 |
| 162 | 4 | 762710.093 | 2457456.623 | 4.650 |
| 162 | 5 | 762714.551 | 2457461.471 | 4.650 |
| 162 | 6 | 762716.590 | 2457459.557 | 4.450 |
| 162 | 7 | 762715.548 | 2457458.394 | 4.450 |
| 162 | 8 | 762721.575 | 2457452.861 | 4.547 |
| 162 | 9 | 762722.940 | 2457454.348 | 4.450 |
| 162 | 10 | 762724.820 | 2457452.559 | 4.450 |
| 162 | 11 | 762720.474 | 2457447.992 | 4.450 |
| 162 | 12 | 762727.295 | 2457441.712 | 4.450 |
| 162 | 13 | 762729.800 | 2457442.474 | 4.050 |
| 162 | 14 | 762729.772 | 2457444.723 | 4.050 |
| 162 | 15 | 762732.915 | 2457445.847 | 4.050 |
| 162 | 16 | 762732.922 | 2457447.431 | 4.150 |
| 162 | 17 | 762737.525 | 2457452.337 | 4.250 |
| 162 | 18 | 762739.062 | 2457452.473 | 4.250 |
| 162 | 19 | 762740.142 | 2457455.602 | 4.050 |
| 162 | 20 | 762742.188 | 2457455.633 | 4.547 |
| 162 | 21 | 762742.843 | 2457458.454 | 4.450 |
| 162 | 22 | 762736.091 | 2457464.763 | 4.547 |
| 162 | 23 | 762731.743 | 2457460.146 | 4.547 |
| 162 | 24 | 762730.198 | 2457461.602 | 4.650 |
| 162 | 25 | 762730.905 | 2457464.146 | 4.850 |
| 162 | 26 | 762726.193 | 2457468.396 | 5.153 |
| 162 | 27 | 762723.761 | 2457467.664 | 4.370 |

There are two distinct methods for processing height information for different conditions, if those nodes on the boundary have respective height information, the height information is stored in the height fields of the node list; otherwise, the height of all nodes are represented by the average height of the whole building.

2) Storing Information for Modeling in the Form of a Binary File

Chart (5) shows the structure of the binary file.

Chart 5

Structure of the binary file

| Item | Value | Data type | Length (unit: Byte) |
|---|---|---|---|
| Number of polygon | Number of the building containing the nodes | integer | 4 |
| Number of node | Number of the connecting order of nodes | integer | 4 |
| X coordinate | X coordinate of node | double precision | 8 |
| Y coordinate | Y coordinate of node | double precision | 8 |
| Z coordinate | Z coordinate of node | double precision | 8 |
| Elevation of the roof | elevation value of the roof | double precision | 8 |

3. Modeling the Main Body of the Building

The model of the main body of the building is generated based on the plane coordinates and elevation data of boundaries thereof and the process thereof is shown below.

Figure 31:
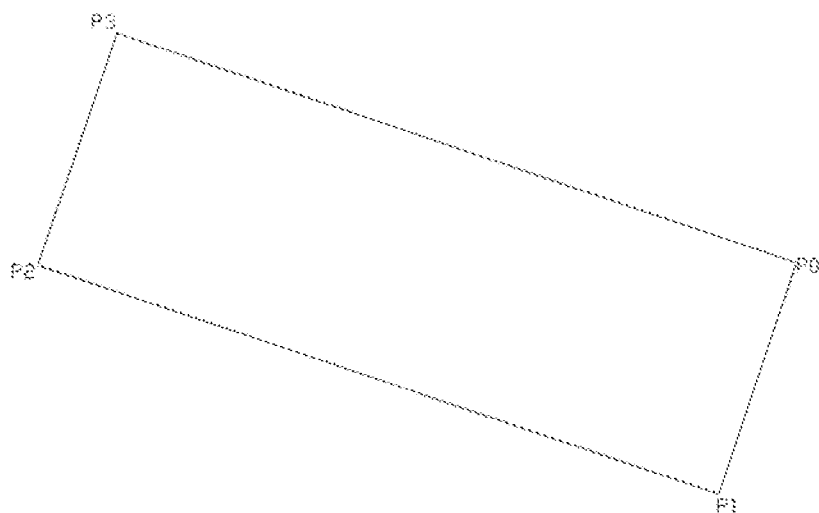
FIGS. 31, 32A-C, 33-34 are schematic diagrams of the modeling of the main body of the building.
Figure 32A:
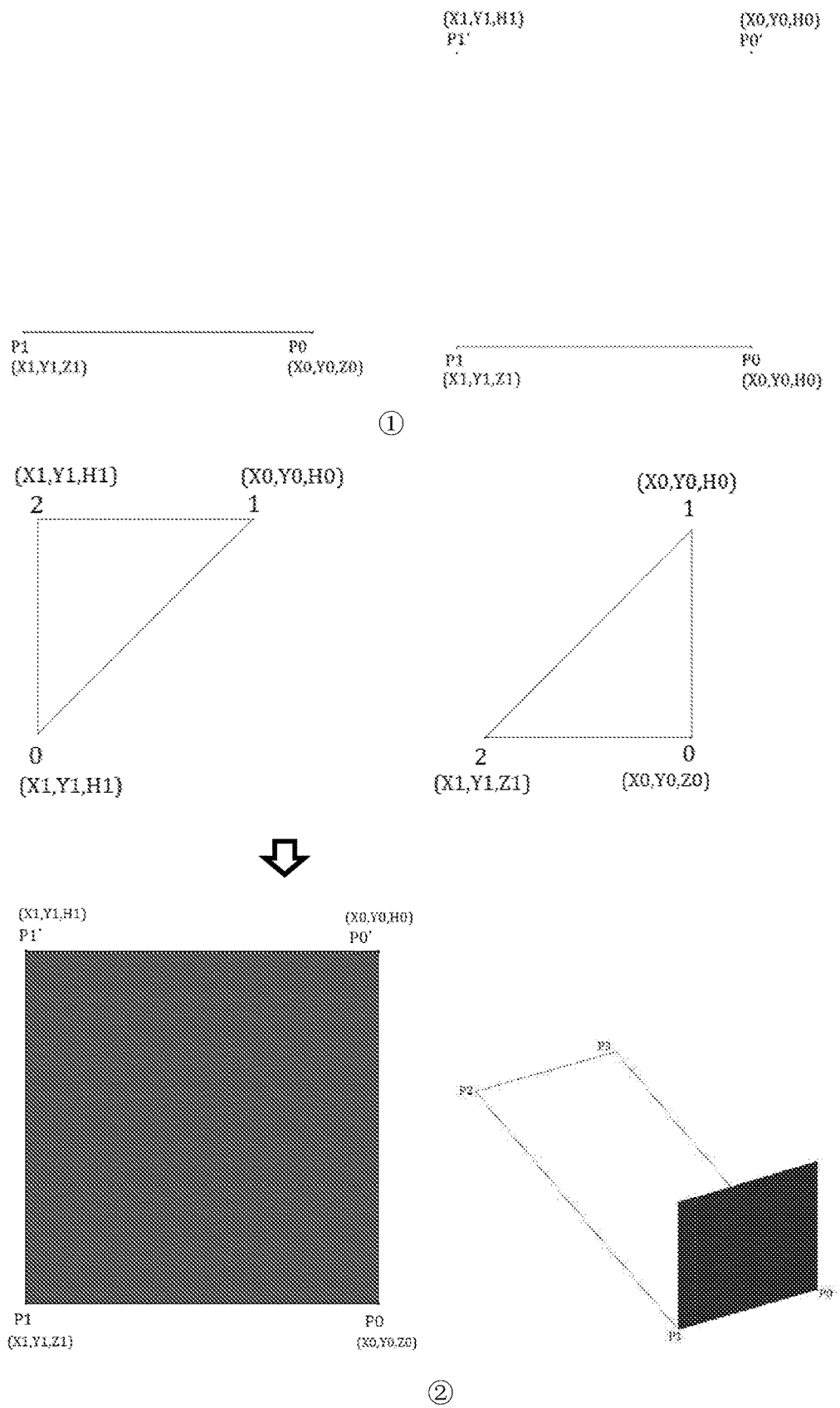
Figure 32B:
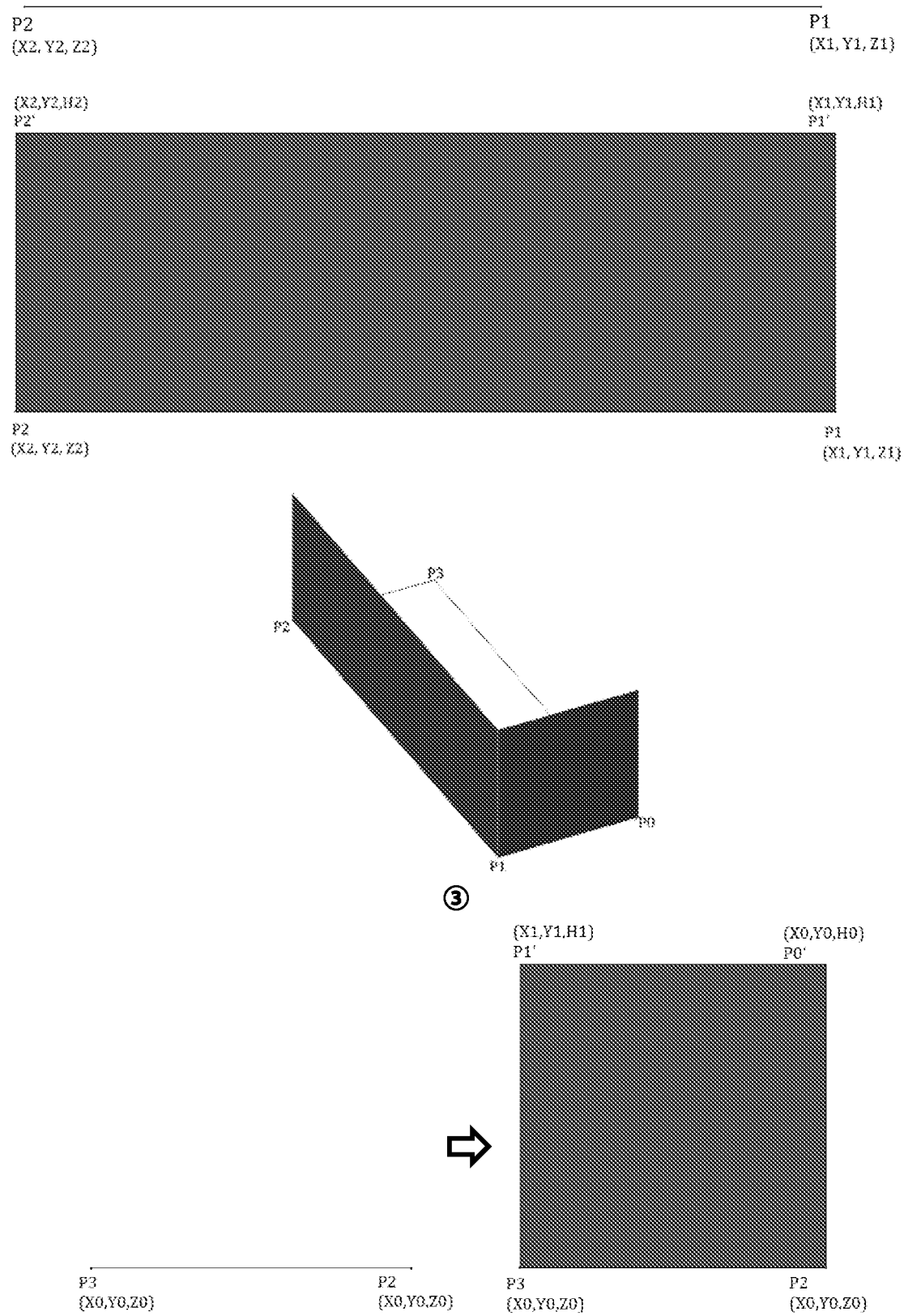
Figure 32C:
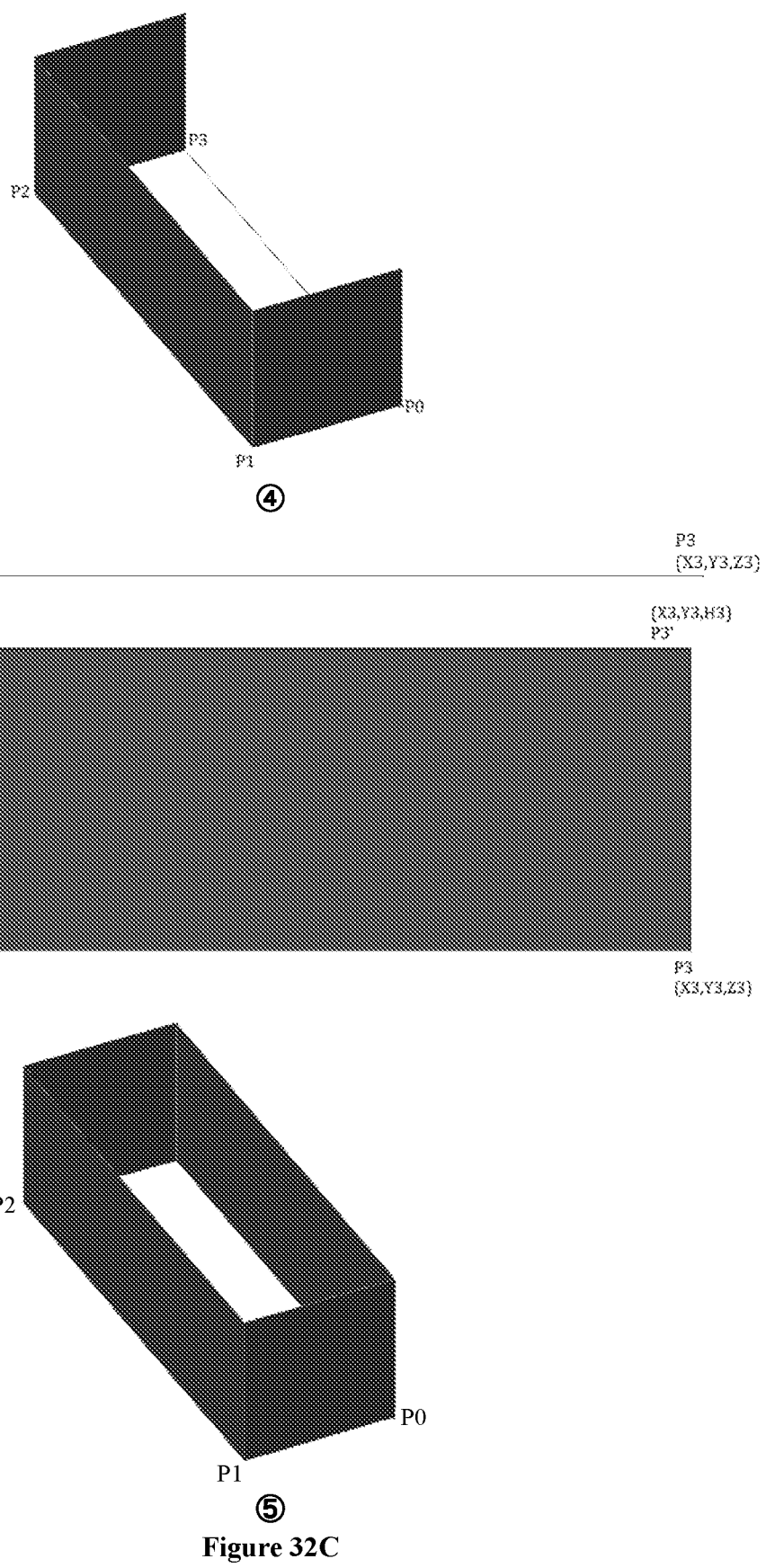

The detailed process of the modeling of the main body for the polygon in FIG. 31 is shown in FIG. 32A-C, the data of nodes are listed in chart (6) which including:
1) reading data of two adjacent nodes successively from the node number 0; generating corresponding points P0'(X0, Y0, H0) and P1' (X1, Y1, H1) in accordance with the plane coordinates of nodes P0 and P1 and the elevation data of the roof;
2) renumbering each set of points P0, P0', P1' and P0, P1', P1 anticlockwise and respectively forming triangles A and B which constitute an integrated side of the building through seamless splice;
3) traversing the next set of nodes and constructing sides of the building in the same manner until the modeling of main body of the polygon completes.

CHART 6

List of data of nodes of the polygon in FIG. 31

| Number of polygon | Number of node | Name of node | X coordinate | Y coordinate | Z coordinate | Elevation of the roof |
|---|---|---|---|---|---|---|
| 0 | 0 | P0 | X0 | Y0 | Z0 | H0 |
| 0 | 1 | P1 | X1 | Y1 | Z1 | H1 |
| 0 | 2 | P2 | X2 | Y2 | Z2 | H2 |
| 0 | 3 | P3 | X3 | Y3 | Z3 | H3 |

Figure 33:
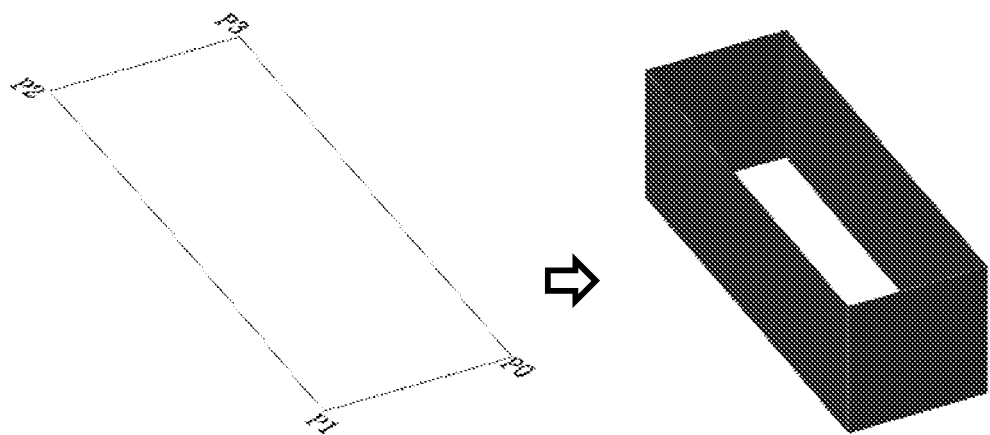

If the height of all nodes of the building is represented by the average height of the whole building, that is, the elevation values of the roof of all nodes are identical, every side of the building is a rectangle, as shown in FIG. 33.

Figure 34:
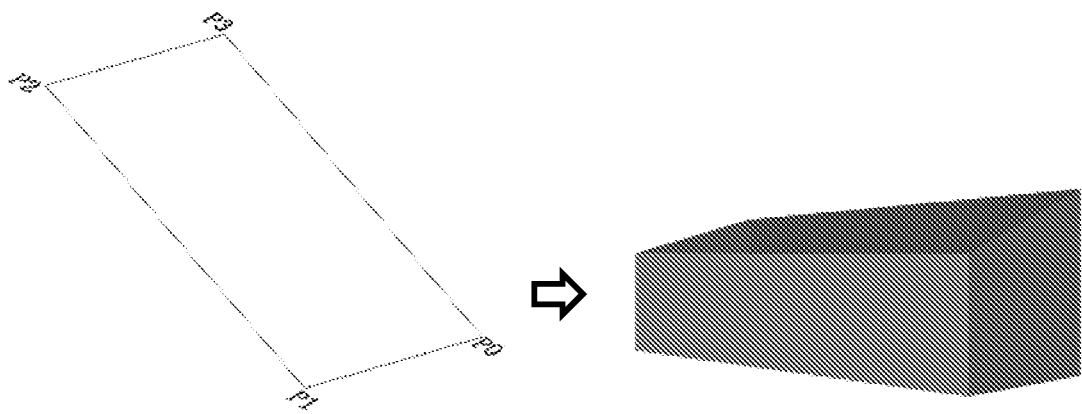

If each node of the building has respective height information, that is, the elevation of the roof of each node is different from each other, the sides of the building may be rectangles or trapezoids, as shown in FIG. 34.

4. Modeling the Roof
1) Modeling Process

Figure 35:
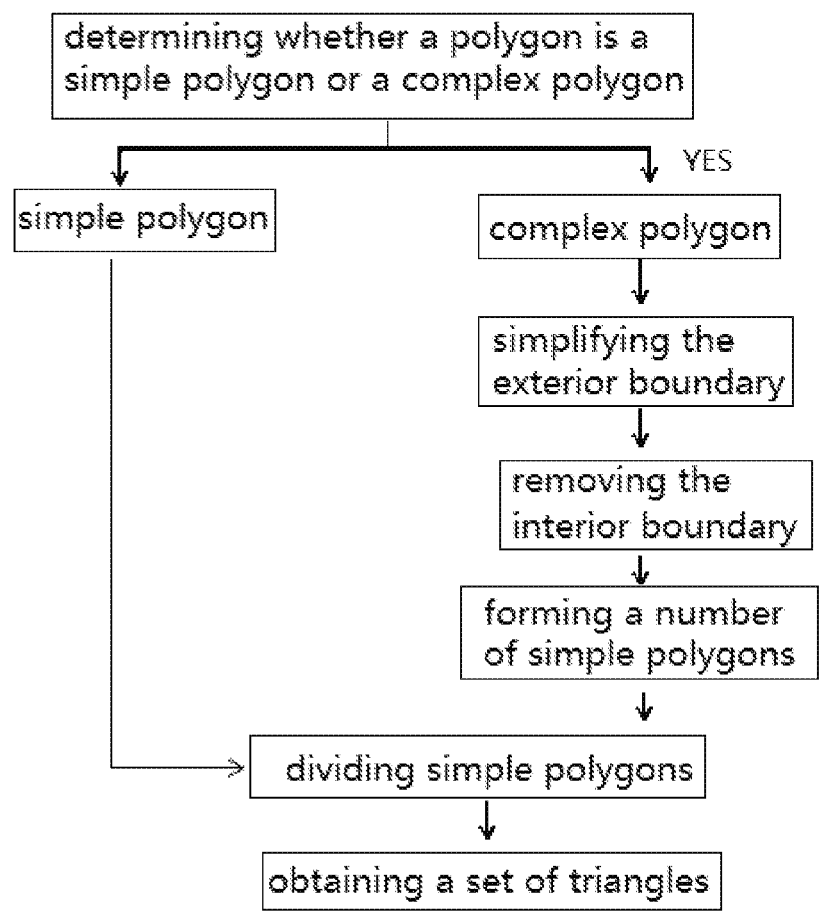
FIG. 35 is a flow chart of the modeling of the roof of the building.

The modeling process of the roof is given below, as shown in FIG. 35:

① determining a polygon of the roof is a simple one or a complex one. As recited above, if the data of nodes of one polygon contains at least two nodes numbered as 0, the polygon is complex, otherwise, it is simple.

② utilizing an algorithm of simple polygon division and transforming the polygon to a set of triangles if the polygon is a simple one, ③ if the polygon is complex, simplifying the exterior boundary of the polygon and removing the interior boundary thereof, through which the complex polygon is transformed to a plurality of simple polygons to be processed later.

In the division process of both simple and complex polygons, determining whether a line segment intersects with others and whether the midpoint of the line segment locates inside the polygon is necessary. Hereinafter the method of the determination applied in the present invention is introduced.

A) Intersection Determination of Line Segments

Intersection determination of line segments is performed before division so as to avoid division errors due to intersection between triangles and interior and exterior boundaries during the process of the division from polygons to triangles. In order to reduce the computing load of the intersection determination of line segments, quick exclusion determination is carried out in advance to exclude these line segments which are impossible to intersect with each other. After that, straddle determination is carried out for these line segments which are likely to intersect so as to find out the line segments intersect or not.

① Quick Exclusion Determination

Figure 36:
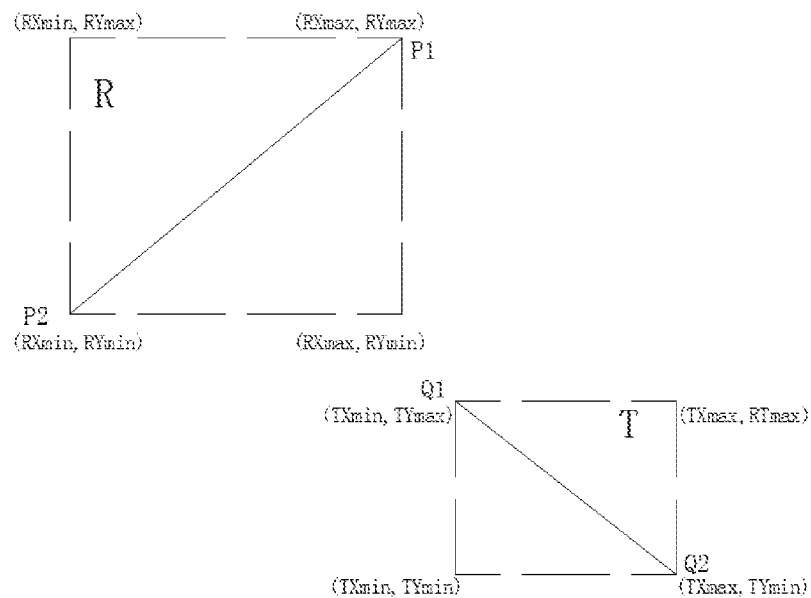
FIGS. 36-39 are schematic diagrams showing the determination on whether the line connecting nodes of the polygon intersects the polygon.
Figure 37:
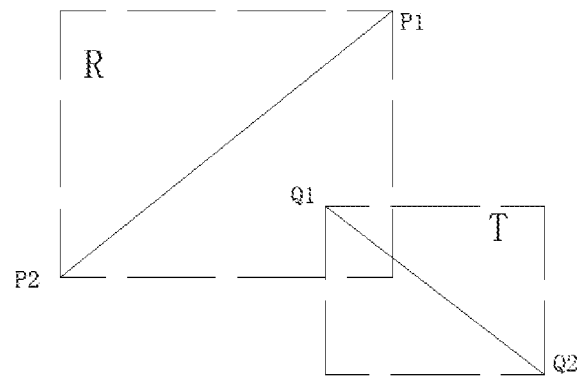
Figure 38:
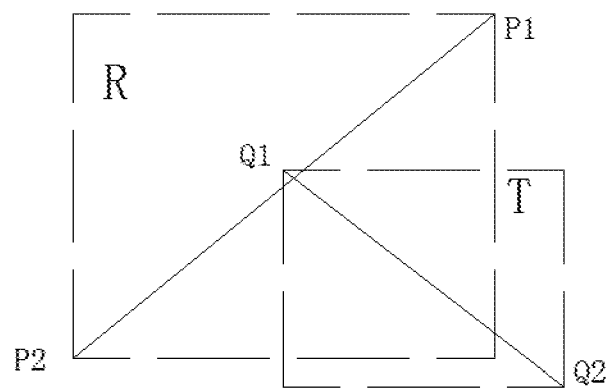

It is assumed that P1=(RXmax, RYmax), P2=(RXmin, RYmin), Q1=(TXmin, TYmin), Q2=(TXmax, TYmax), the envelop object of the line segment P1P2 is R and the envelop object of the line segment Q1Q2 is T. If R does not intersect with T, the line segments P1P2, Q1Q2 will never intersect with each other, as shown in FIG. 36. If R intersects with T, the line segments P1P2, Q1Q2 may intersect with each other or not, as shown in FIGS. 37, 38. The chart (7) lists the boundary values of the envelop objects R and T.

Chart 7

List if boundary values of the envelop objects R and T

| Envelop object | Content | Value |
|---|---|---|
| R | Minimum value of X coordinate | RXmin = min( ) |
| | Maximum value of X coordinate | RXmax = max( ) |
| | Minimum value of Y coordinate | RYmin = min( ) |
| | Maximum value of Y coordinate | RYmax = max( ) |
| T | Minimum value of X coordinate | TXmin = min( ) |
| | Maximum value of X coordinate | TXmax = max( ) |
| | Minimum value of Y coordinate | TYmin = min( ) |
| | Maximum value of Y coordinate | TYmax = max( ) |

Figure 39:
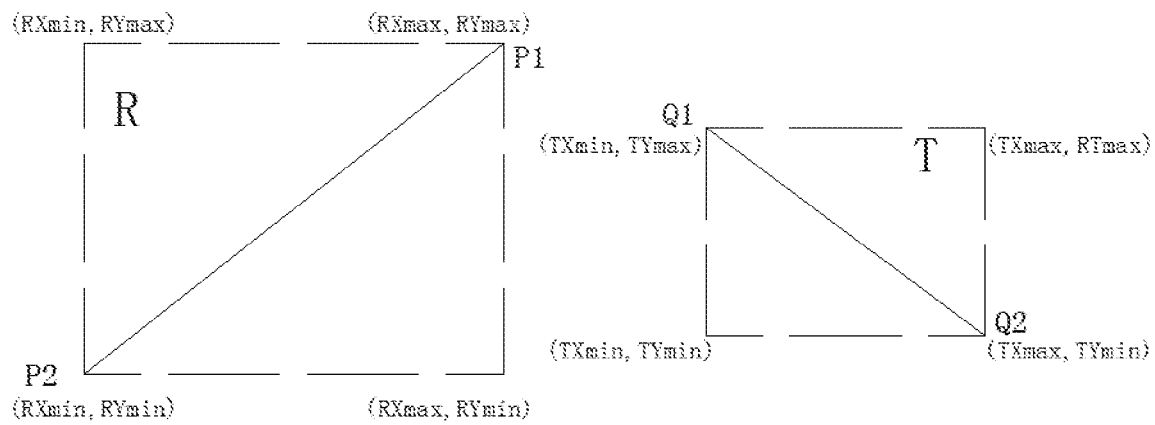
Figure 40:
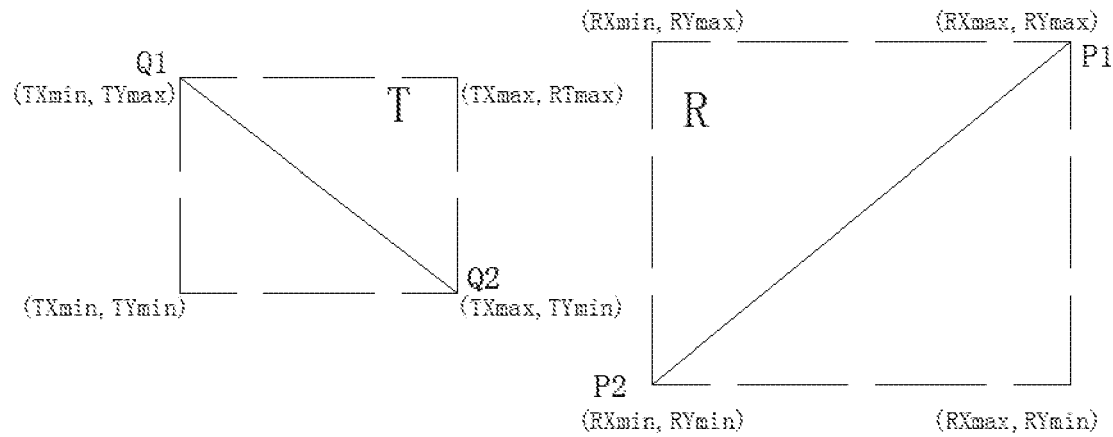

There are four conditions under which R does not intersect with T, and the line segment P1P2 will never intersect with the line segment Q1Q2 as long as one of conditions is met. The conditions are listed below:
Condition 1, RXmax<TXmin, as shown in FIG. 39;
Condition 2, RXmin>TXmax, as shown in FIG. 40;
Condition 3, RYmax<TYmin, as shown in FIG. 41;
Condition 4, RYmin>TYmax, as shown in FIG. 42.

② Straddle Determination

Definition: if the line segment P1P2 straddles the line segment Q1Q2, the points P1 and P2 respectively locate on different sides of the line on which the line segment Q1Q2 locates. If the line segment Q1Q2 straddles the line segment P1P2, the points Q1 and Q2 respectively locate on different sides of the line on which the line segment P1P2 locates. Only when the line segment P1P2 straddles the line segment Q1Q2 and the line segment Q1Q2 straddles the line segment P1P2, the line segment P1P2 intersects with the line segment Q1Q2.

It is assumed that coordinates of the endpoints of the line segment P1P2 are P1 (X1,Y1) and P2 (X2,Y2), and coordinates of the endpoints of the line segment Q1Q2 are Q1 (X3,Y3) and Q2 (X4,Y4).

The vector Q1Q2=(X4−X3, Y4−Y3) and the vector Q1P1=(X3−X1, Y3−Y1), the vector product of the vector Q1Q2 and the vector Q1P1 is S1=(X4−X3)*(Y3−Y1)−(X3−X1)*(Y4−Y3). If S1<0, the point P1 locates on the right side of the line segment Q1Q2; if S1>0, the point P1 locates on the left side of the line segment Q1Q2; and if S1=0, the point P1 locates on the line segment Q1Q2.

Likewise, it is assumed that the vector Q1P2=(X3−X2, Y3−Y2) and the vector product of the vector Q1Q2 and the vector Q1P2 is S2=(X4−X3)*(Y3−Y2)−(X3−X2)*(Y4−Y3). If S2<0, the point P2 locates on the right side of the line segment Q1Q2; if S2>0, the point P2 locates on the left side of the line segment Q1Q2; and if S2=0, the point P2 locates on the line segment Q1Q2.

If S1>0 and S2<0, the point P1 locates on the left side of the line segment Q1Q2 and the point P2 locates on the right side of the line segment Q1Q2, as shown in FIG. 43; or if S1<0 and S2>0, the point P1 locates on the right side of the line segment Q1Q2 and P2 locates on the left side of the line segment; Briefly, when S1*S2<0, line segment P1P2 straddles line segment Q1Q2.

It is assumed that vector P1P2=(X1−X2, Y1−Y2), vector P1Q1=(X1−X3, Y1−Y3), vector P1Q2=(X1−X4, Y1−Y4), the vector product of vector P1P2 and vector P1Q1, S3=(X1−X2)*(Y1−Y3)−(X1−X3)*(Y1−Y2), the vector product of vector P1P2 and vector P1Q2 S4=(X1−X2)*(Y1−Y4)−(X1−X4)*(Y1−Y2). If S3*S4<0, line segment Q1Q2 straddles line segment P1P2.

Figure 44:
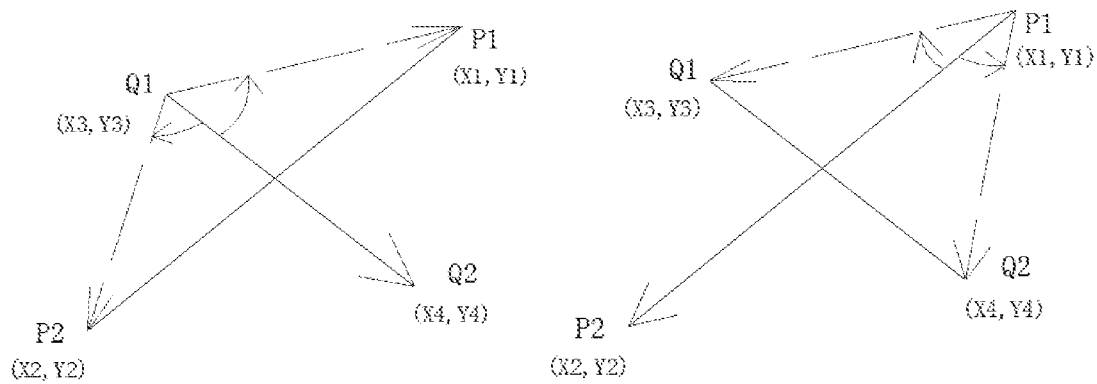
Figure 45:
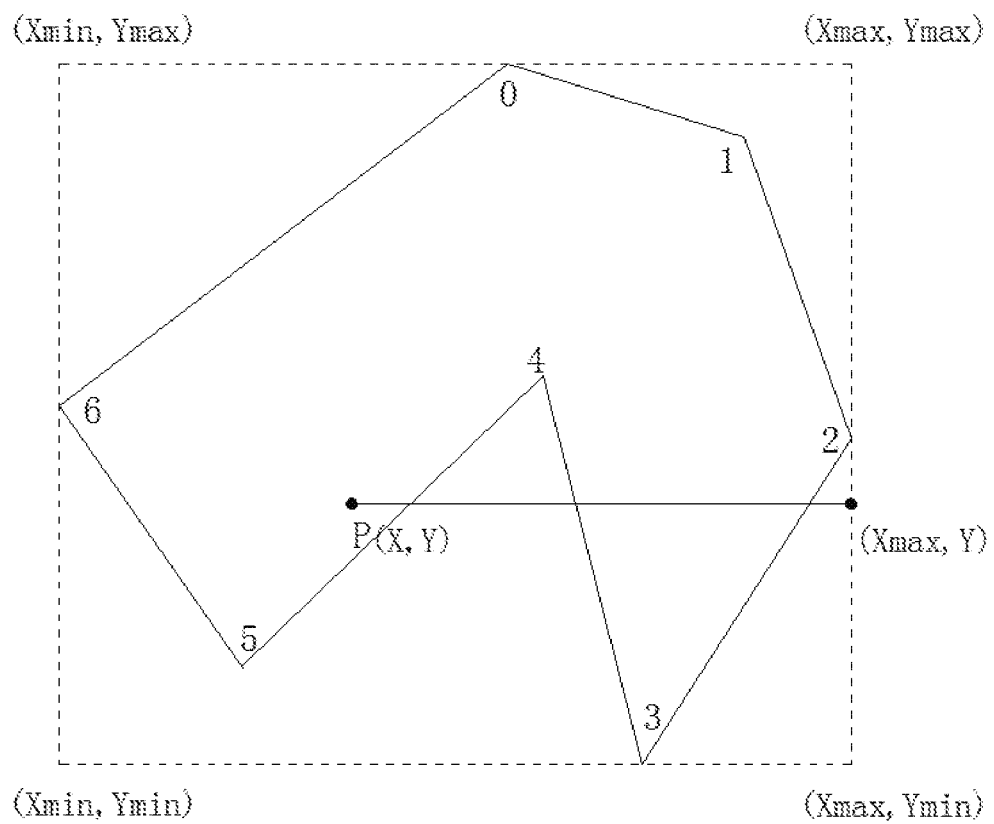
Figure 46:
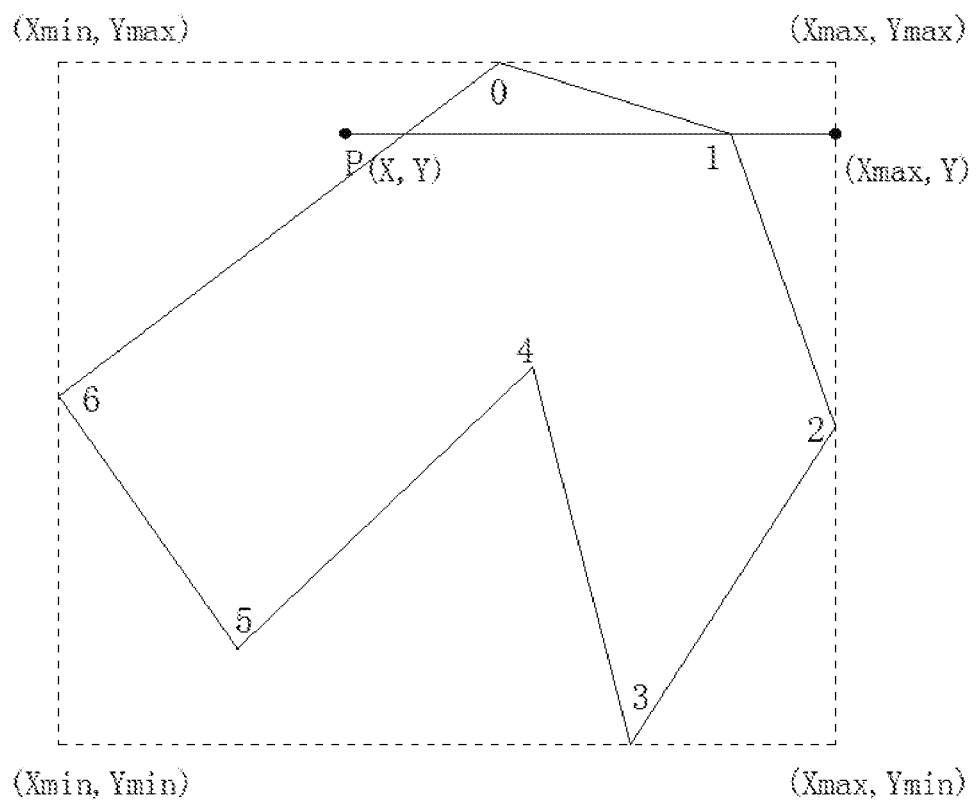

If S1*S2<0 and S3*S4<0, that is, line segment P1P2 straddles line segment Q1Q2 and line segment Q1Q2 straddles line segment P1P2 at the same time, so line segment P1P2 intersect with line segment Q1Q2, as shown in FIG. 44.

B) Determining a Point is Inside the Polygon or Not

Definition: draw a ray from a point to be assessed, if the number of the intersections between the ray and all the edges of the polygon is odd, the point locates inside the polygon; otherwise, if the number is even, the point locates outside of the polygon.

For a point P (X, Y) to be assessed, i. calculating the envelop object of the polygon and recording the maximum value of X coordinates of the polygon Xmax;

ii. assuming a line segment L with endpoints (X, Y), (Xmax, Y);

iii. finding out the times the line segment L intersects with edges of the polygon;

iv. Determining the times of intersection is odd or even, if odd, a result that the point P is inside the polygon returns, otherwise, if even, a result that the point P is outside the polygon returns.

Hereinbefore described is how to determine whether line segments intersect and whether the midpoint of the connecting line between the line segments is inside the polygon. Next, how the simple polygons and complex polygons are divided is described in detail on the basis of the method above.

2) Division of Simple Polygons

Figure 47:
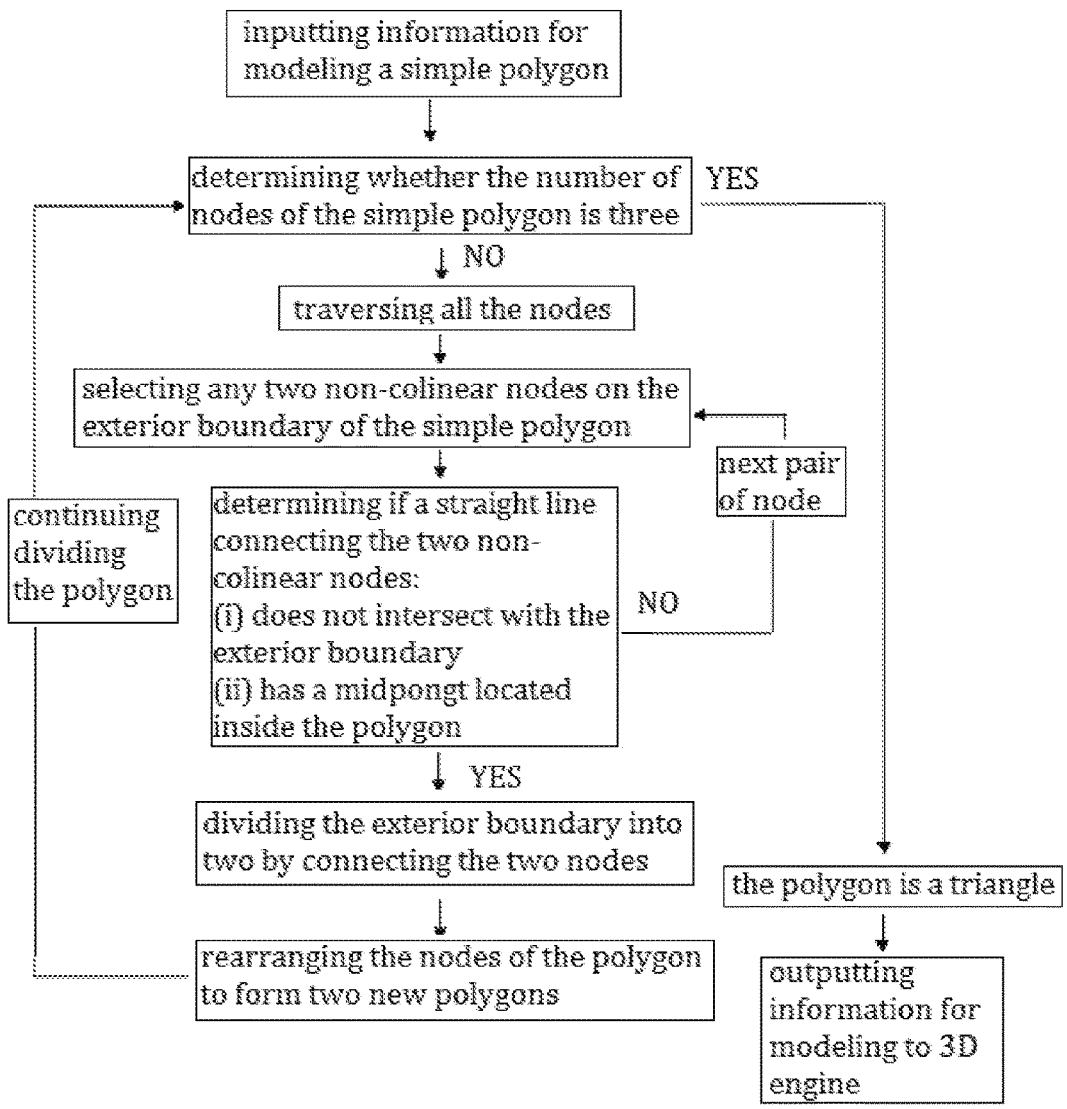
FIG. 47 is a flow chart of the division of a simple polygon of the present invention.

If a simple polygon is input, the flow for dividing it into a set of triangles is shown in FIG. 47. Taking the polygon in FIG. 48 as an example, nodes of it are listed in chart 8, and the division process is shown in FIG. 49A-D.

Chart 8

Figure 48:
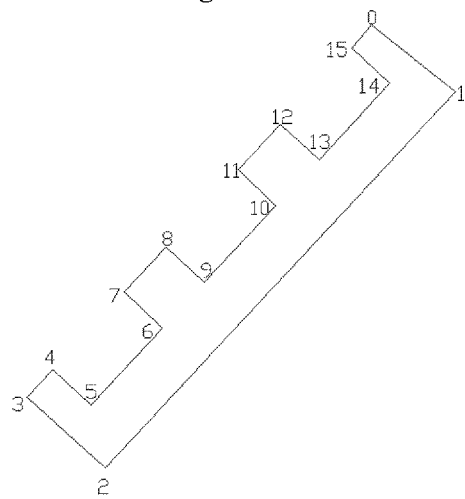
FIGS. 48, 49A-D show the process of division of a simple polygon of an embodiment of the present invention.
Figure 49A:
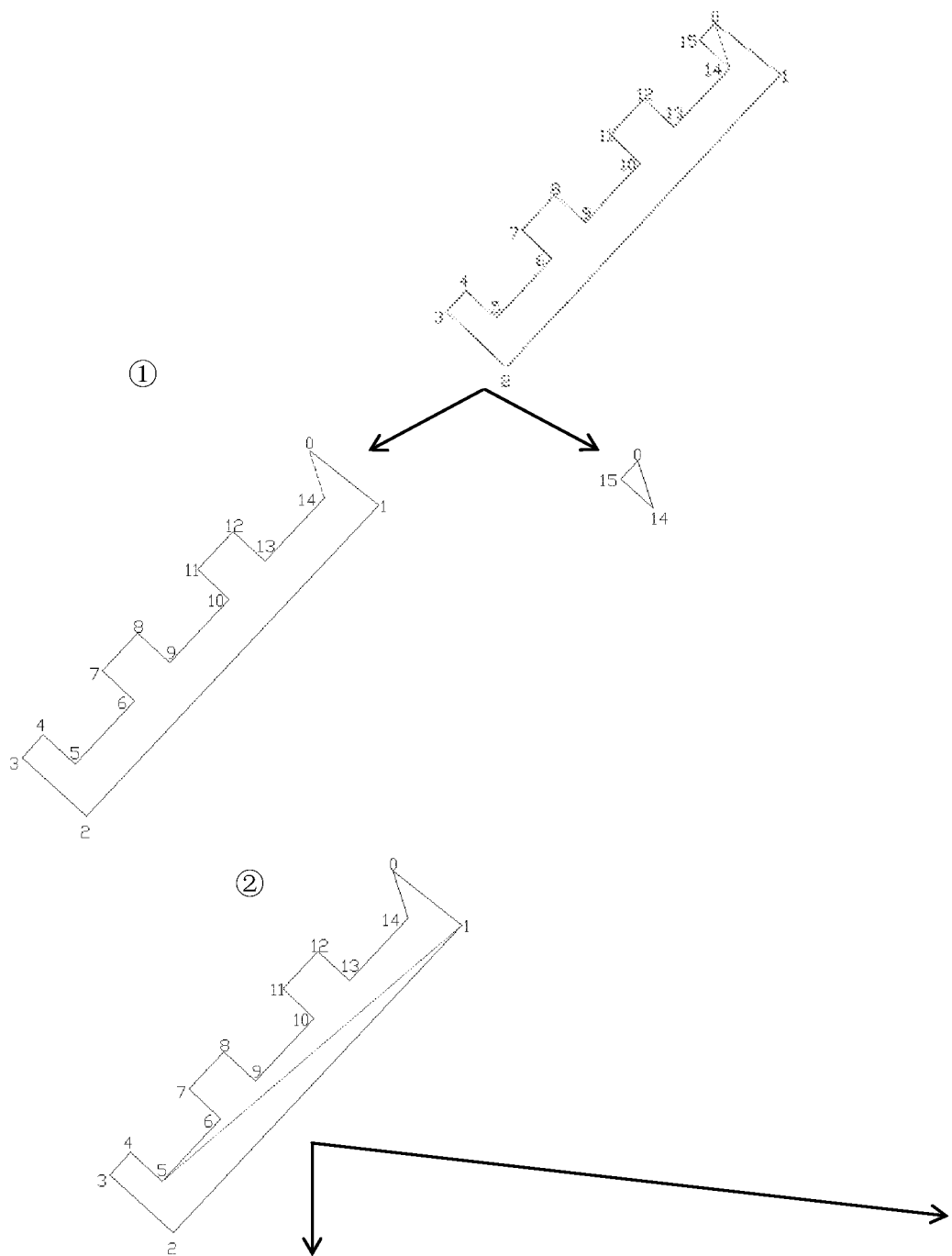
Figure 49B:
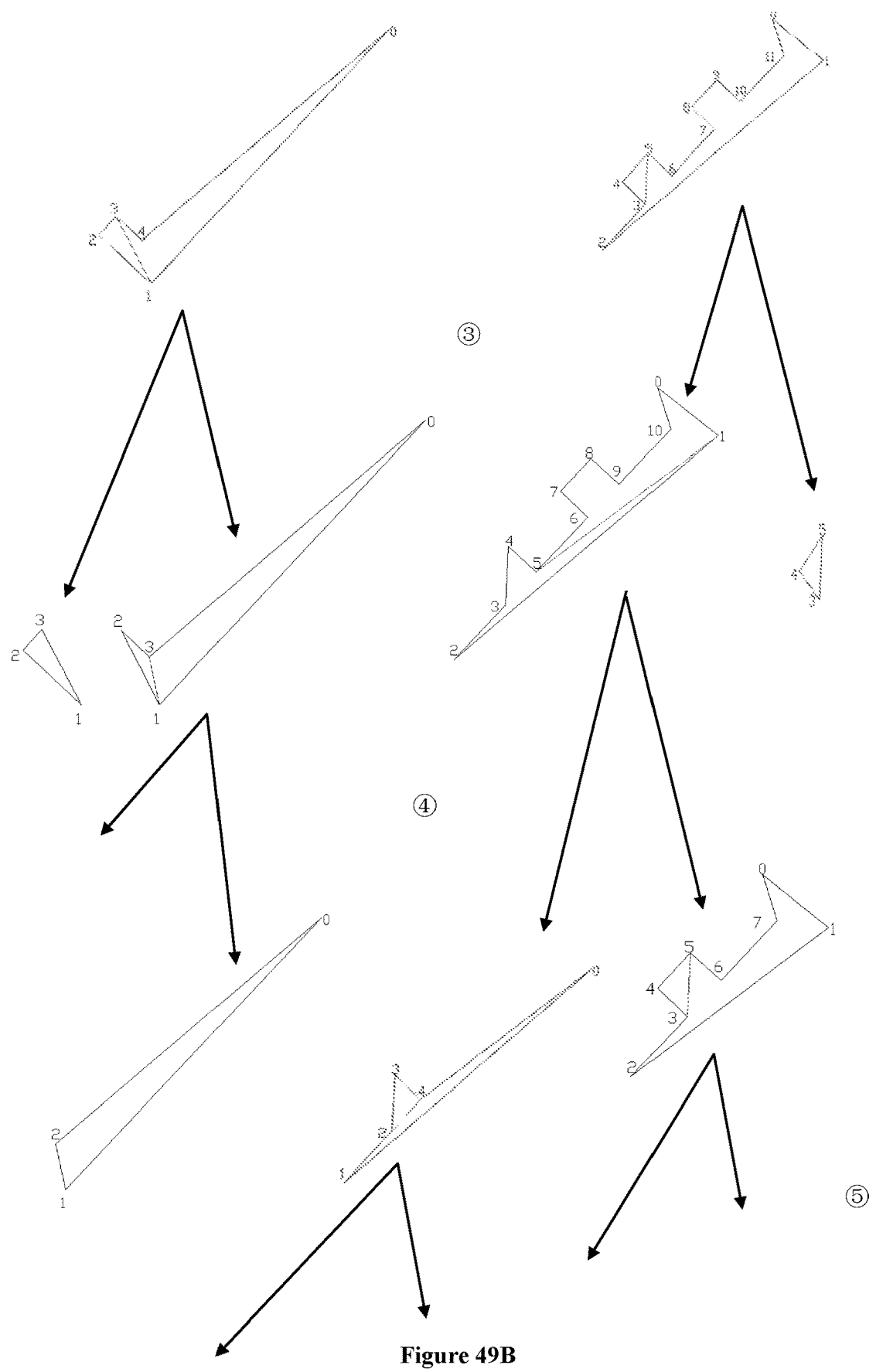
Figure 49C:
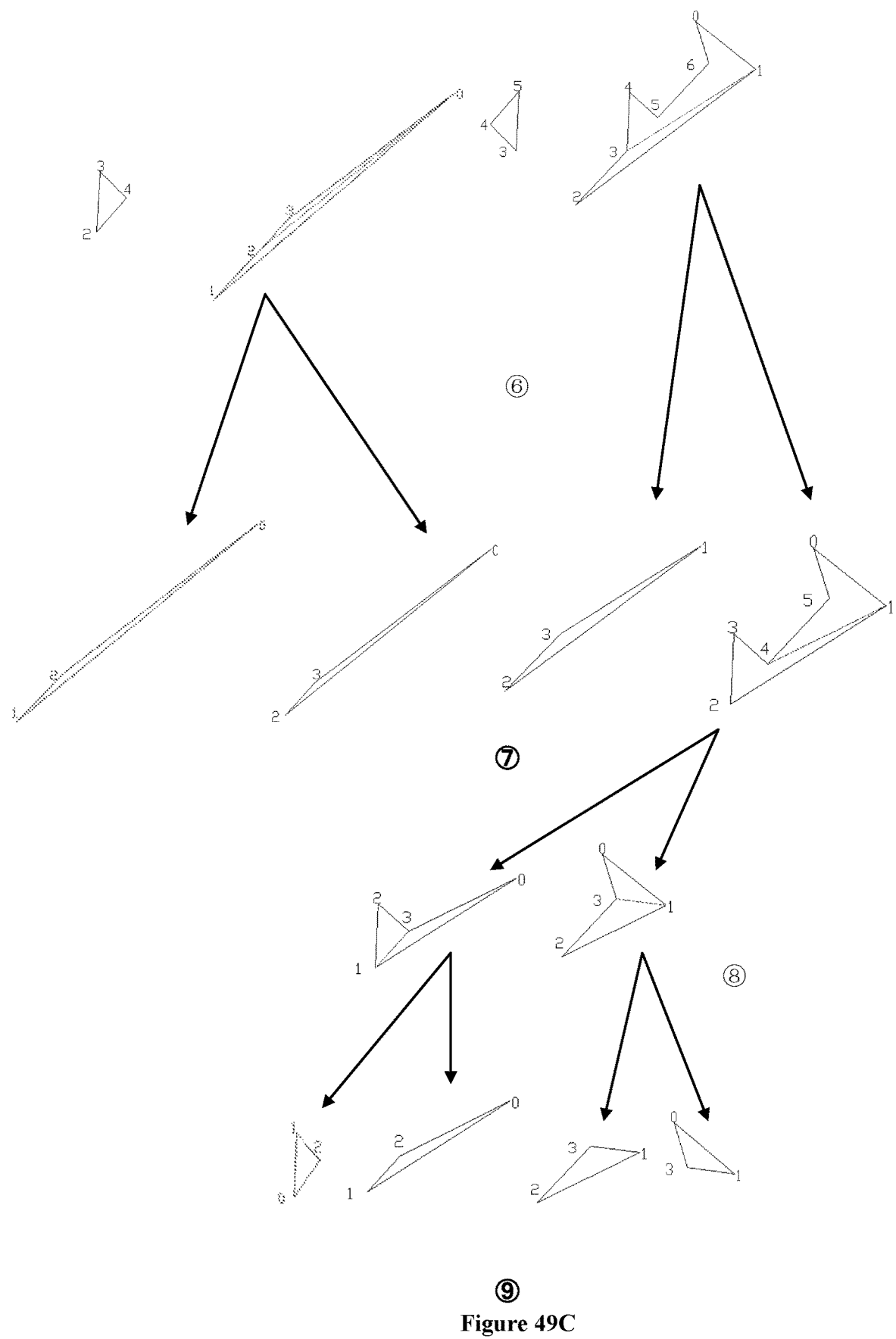
Figure 49D:
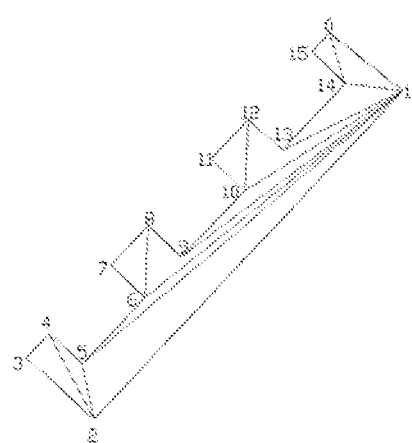

List of nodes of the polygon in FIG. 48

| Number of polygon | Number of node | X coordinate | Y coordinate | Z coordinate |
|---|---|---|---|---|
| 0 | 0 | 762519.058 | 2457552.854 | 20.000 |
| 0 | 1 | 762531.394 | 2457543.073 | 20.000 |
| 0 | 2 | 762479.674 | 2457487.843 | 20.000 |
| 0 | 3 | 762468.250 | 2457498.267 | 20.000 |
| 0 | 4 | 762472.036 | 2457502.325 | 20.000 |
| 0 | 5 | 762477.655 | 2457497.092 | 20.000 |
| 0 | 6 | 762488.149 | 2457508.298 | 20.000 |
| 0 | 7 | 762482.479 | 2457513.635 | 20.000 |
| 0 | 8 | 762488.759 | 2457520.339 | 20.000 |
| 0 | 9 | 762494.378 | 2457515.107 | 20.000 |
| 0 | 10 | 762504.925 | 2457526.281 | 20.000 |
| 0 | 11 | 762499.337 | 2457531.661 | 20.000 |
| 0 | 12 | 762505.537 | 2457538.323 | 20.000 |
| 0 | 13 | 762511.270 | 2457533.113 | 20.000 |
| 0 | 14 | 762521.769 | 2457544.272 | 20.000 |
| 0 | 15 | 762516.154 | 2457549.566 | 20.000 |

3) Division of Complex Polygons

As for a complex polygon, it is necessary to simplify its exterior boundary firstly, and the exterior boundary is divided into a plurality of simple polygons without changing information for modeling of the interior boundary. Next, the algorithm for removing the interior boundary is performed on the remaining simplified complex polygon so that the interior and exterior boundaries merge through the line connecting them and the interior boundary is removed. After removing the interior boundary, the polygon is divided into a plurality of triangles through the algorithm for dividing simple polygons to be input to the 3D engine.

Figure 50:
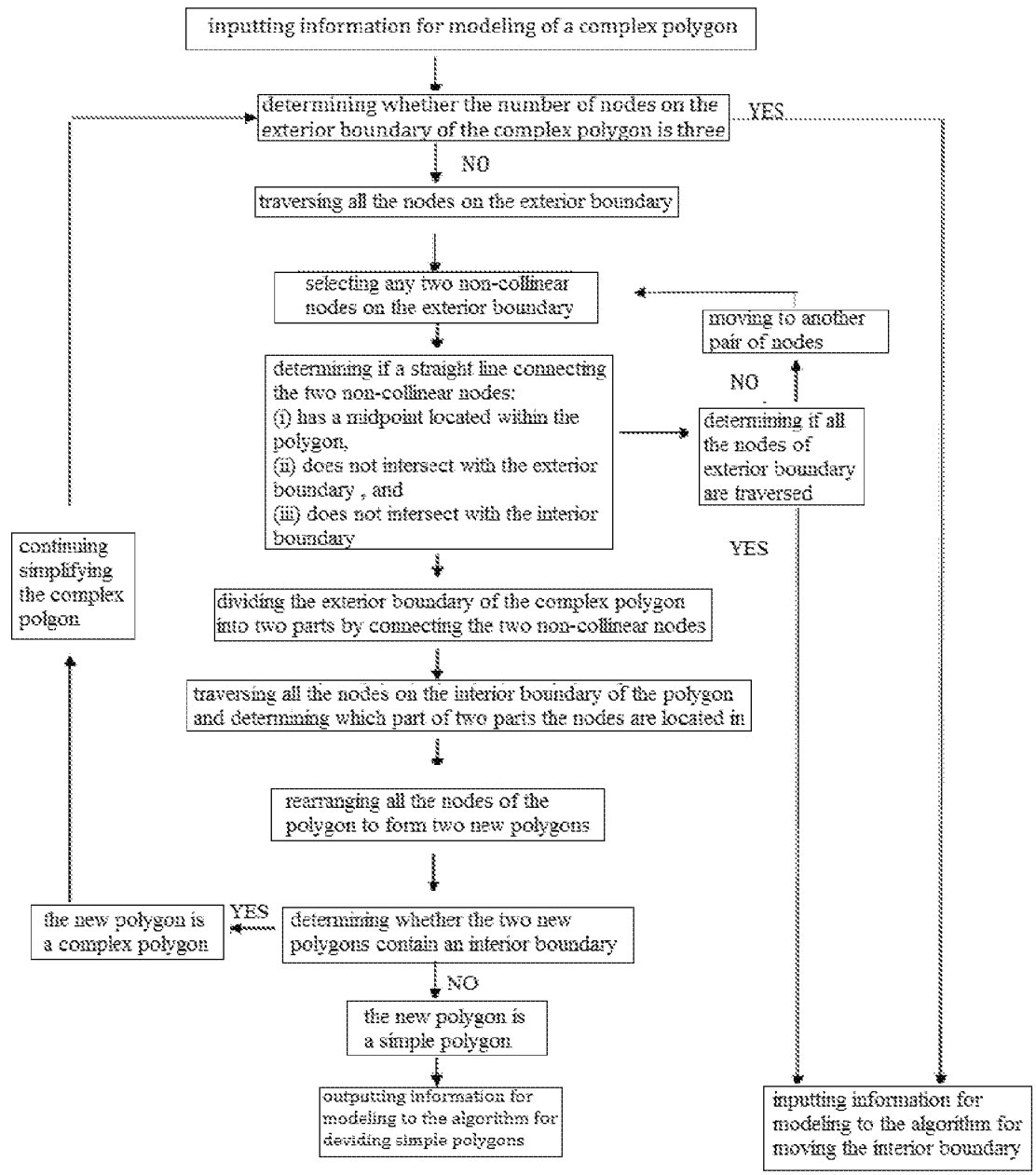
FIG. 50 is a flow chart of the simplification of the exterior boundaries of the complex polygon of the present invention.

Firstly, the method for simplifying exterior boundary is performed on the complex polygon and the process is shown in FIG. 50.

Figure 51:
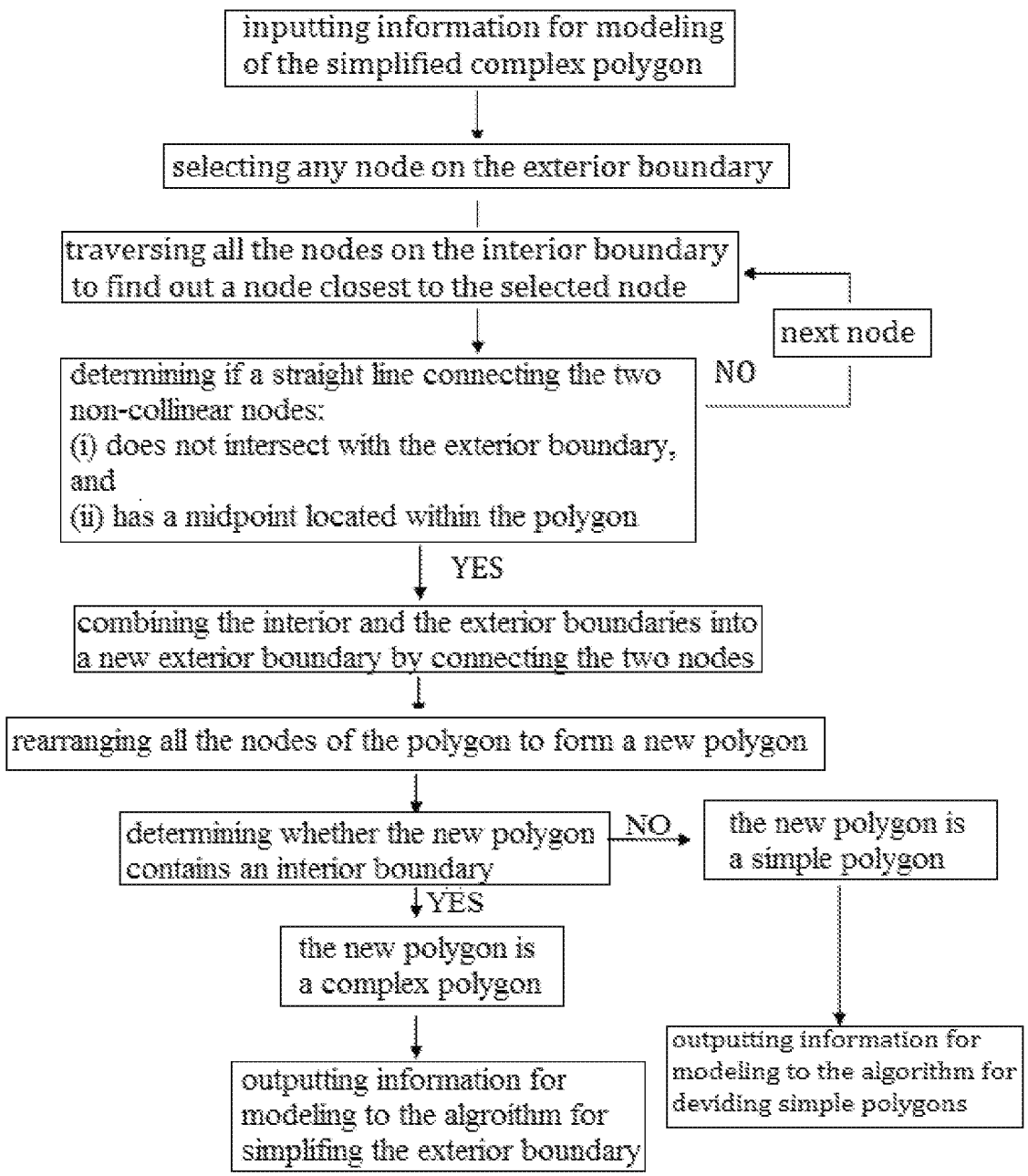
FIG. 51 is a flow chart of the removal of interior boundaries of the complex polygon of the present invention.

Next, the method for removing interior boundary is performed on the complex polygon with simplified exterior boundary, the process of which is shown in FIG. 51.

Figure 52:
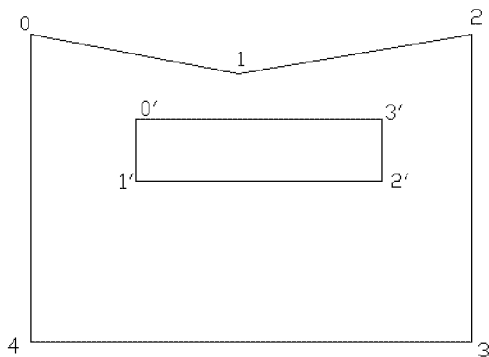
FIGS. 52-59, 60A-B, 61-62 show the process of division of the complex polygon of the present invention.

The polygon in FIG. 52 is taken as an example in the following description. Data of the nodes on the boundary in FIG. 52 is listed in chart (9).

Chart 9

Boundary nodes of the polygons in FIG. 52

| Number of polygon | Number of node | X coordinate | Y coordinate | Z coordinate |
|---|---|---|---|---|
| 0 | 0 | 762660.366 | 2457590.677 | 20.000 |
| 0 | 1 | 762770.739 | 2457569.384 | 20.000 |
| 0 | 2 | 762894.976 | 2457590.677 | 20.000 |
| 0 | 3 | 762894.976 | 2457428.319 | 20.000 |
| 0 | 4 | 762660.366 | 2457428.319 | 20.000 |
| 1 | 0 | 762716.352 | 2457545.430 | 20.000 |
| 1 | 1 | 762716.352 | 2457512.958 | 20.000 |
| 1 | 2 | 762846.987 | 2457512.958 | 20.000 |
| 1 | 3 | 762846.987 | 2457545.430 | 20.000 |

Figure 53:
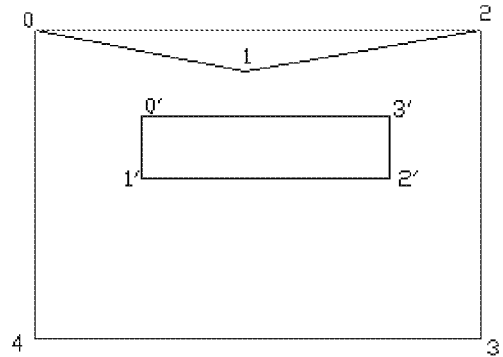
Figure 54:
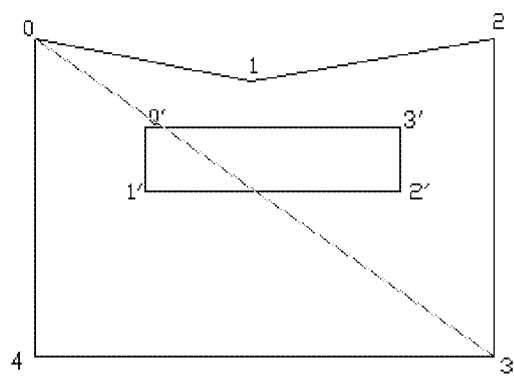
Figure 55:
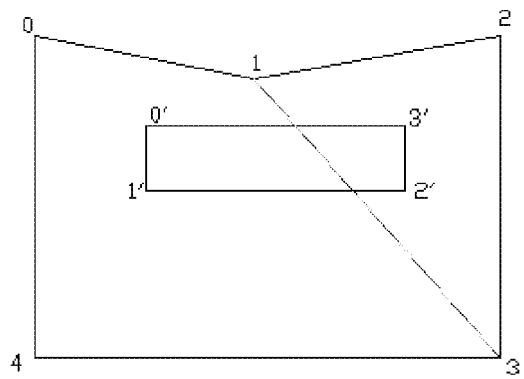

Firstly, the exterior boundary of the polygon shown in FIG. 52 is simplified by selecting two non-adjacent nodes on the exterior boundary, and determining whether the line segment between them intersects with the interior or exterior boundary and whether the midpoint of the line segment locates inside the polygon, which further includes following steps:

i. selecting node number 0 as a first node and node number 2 as a second node (node number 1 is adjacent to node number 0, so it is not selected). As shown in FIG. 53: the midpoint of the line segment connecting the first node and the second node locates outside of the polygon, so they are not suitable to be connected with each other and another pair of nodes should be selected.

ii. selecting node number 0 as a first node and node number 3 as a second node. As shown in FIG. 54: the line segment connecting the first node and the second node intersects with the interior boundary so they are not suitable to be connected with each other and another pair of nodes should be selected.

iii. selecting node number 1 as a first node and node number 3 as a second node. As shown in FIG. 55: the line segment connecting the first node and the second node intersects with the interior boundary so they are not suitable to be connected with each other and another pair of nodes should be selected.

Until a line segment which does not intersect with any of the interior and exterior boundaries and the midpoint of it locates inside the polygon is found out, the polygon is divided into two by the line segment.

If there is no such a line segment which meets the condition above, which means there no further simplification can be performed on the exterior boundary and then the process of interior boundary removal as follows is performed as follows:

Selecting a node on the exterior boundary, and finding out a node on the interior boundary closest to it, determining whether the line segment between the two nodes intersects with the interior or exterior boundary; if not, connecting the two nodes and renumbering the nodes of the polygon to form a new boundary of the polygon; otherwise, selecting another node and performing the determination above.

Selecting node number 0 on the exterior boundary and traversing all the nodes on the interior boundary one by one to find out the node closest to the node number 0 (i.e., node number 0').

Figure 56:
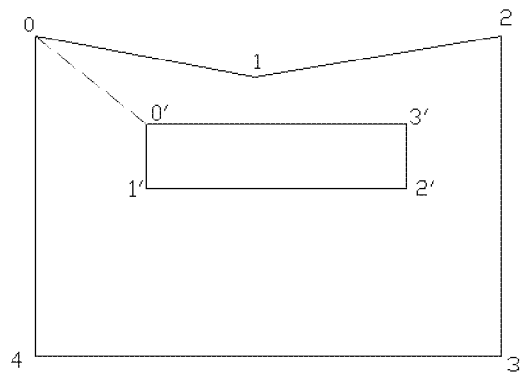

The line segment connecting the two nodes does not intersect with either the interior boundary or the exterior boundary, so the two nodes are connected, as shown in FIG. 56.

Figure 57:
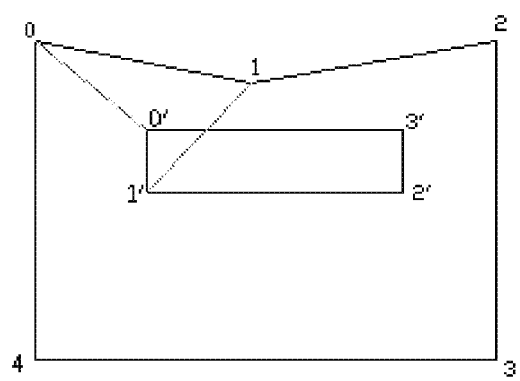
Figure 58:
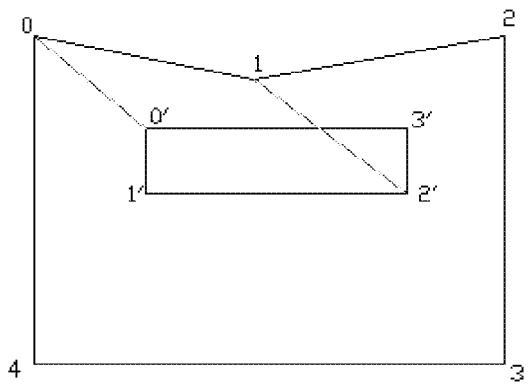
Figure 59:
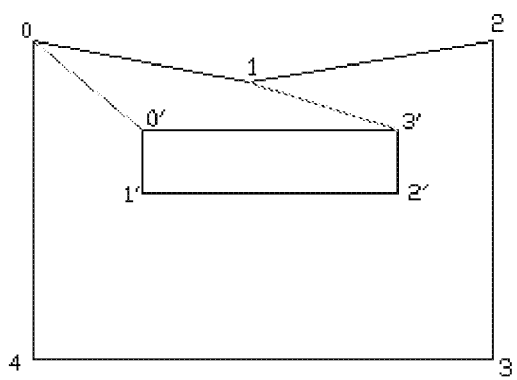

Until now, a line segment connecting the interior boundary and the exterior boundary is found out, next another line segment with different endpoints should be found out to entirely divide the polygon into two. Specifically, it includes following steps:

i. selecting node number 1 as a first node and node number 1' as a second node (node number 0' is adjacent to node number 0, so it is not selected). As shown in FIG. 57: the line segment connecting the first node and the second node intersects with the interior boundary so they are not suitable to be connected with each other and another pair of nodes should be selected.

ii. selecting node number 1 as a first node and node number 2' as a second node. As shown in FIG. 58: the line segment connecting the first node and the second node intersects with the interior boundary so they are not suitable to be connected with each other and another pair of nodes should be selected.

iii. selecting node number 1 as a first node and node number 3' as a second node. As shown in FIG. 59, the line segment connecting the first node and the second node does not intersect with the interior or the exterior boundary so they are connected with each other.

Figure 60A:
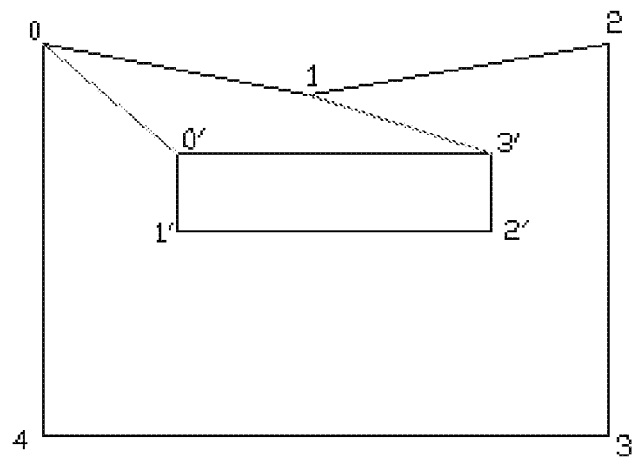
Figure 60B:
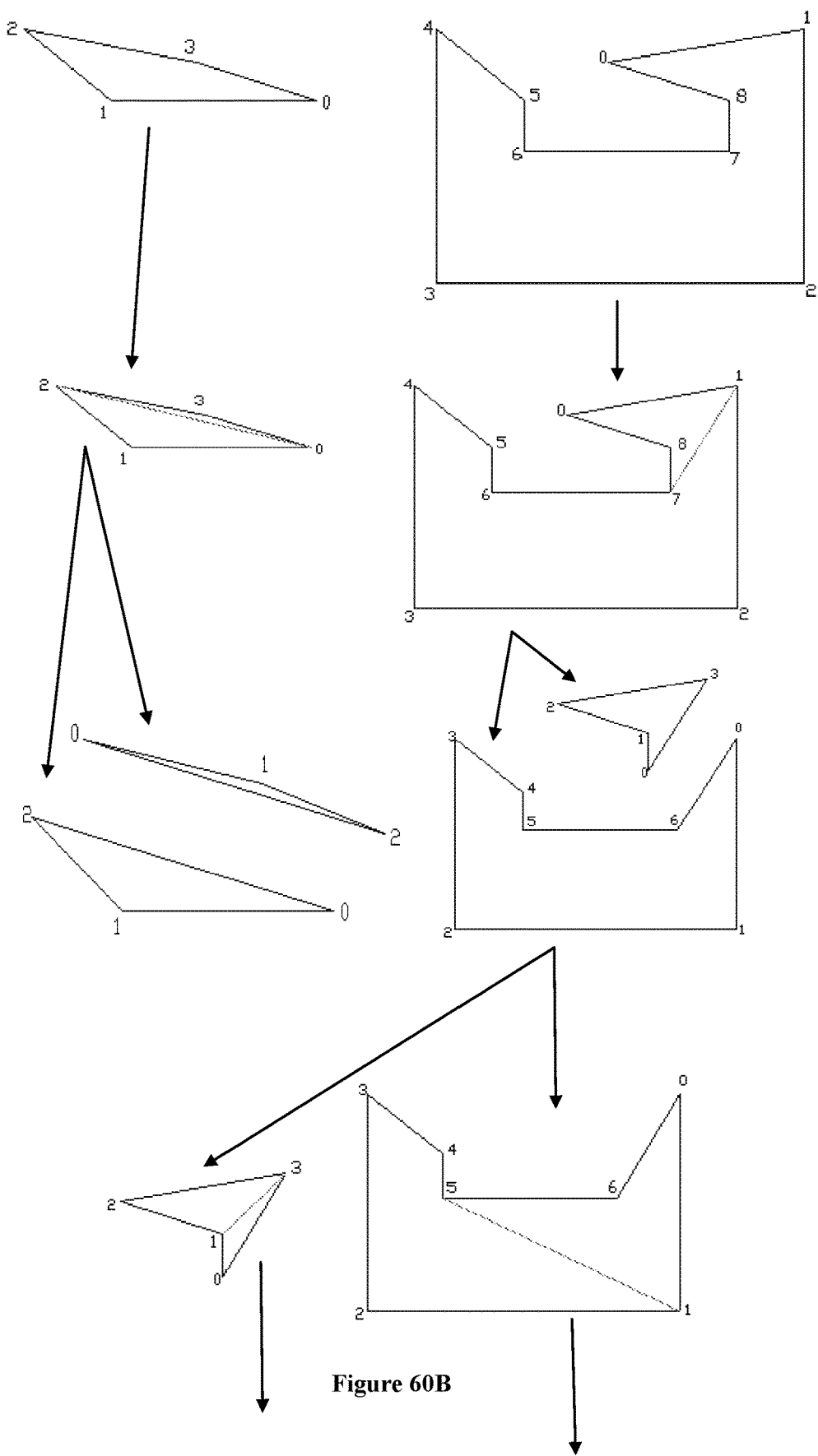

The polygon is divided into two polygons by the two line segments, a polygon enclosed by points (0, 1, 3', 0', 0) and another polygon enclosed by points (1, 2, 3, 4, 0, 0', 1', 2', 3', 1), and these two polygons are renumbered for the next process, as shown in FIG. 60A-B.

Figure 61:
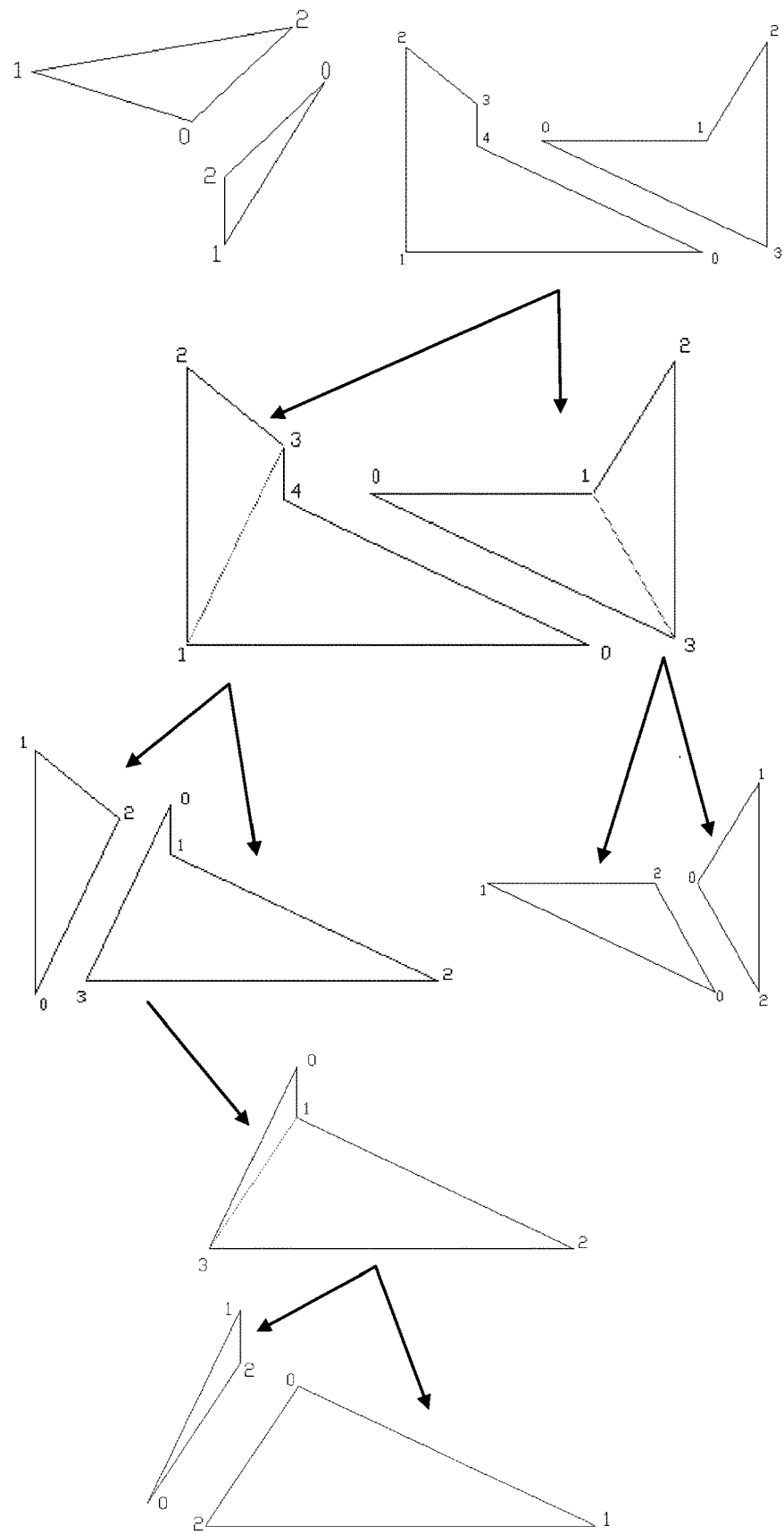

Now, there is no interior boundary in the present polygons and the division algorithm of simple polygons can be carried out, which including the steps of: selecting two non-adjacent nodes on the exterior boundary, and if the line segment between them does not intersects with the exterior boundary and the midpoint of the line segment locates inside the polygon, connecting the two nodes and dividing the polygon into two new polygons. Next, further simplifying processes are performed on the two new polygons until they are divided into triangles entirely, as shown in FIG. 61.

Figure 62:
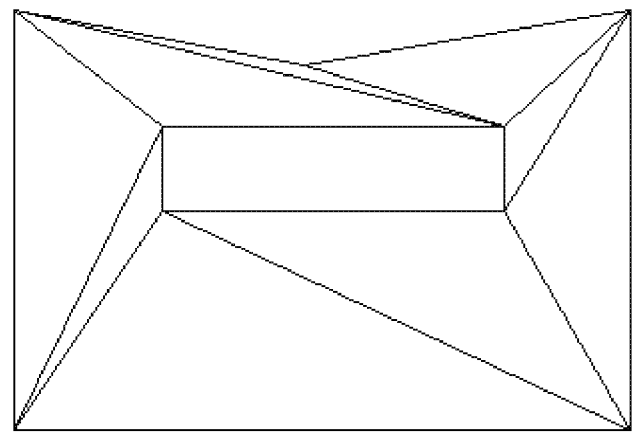

At last, these triangles are input to the 3D engine for modeling. FIG. 62 shows the polygon after division.

Figure 63A:
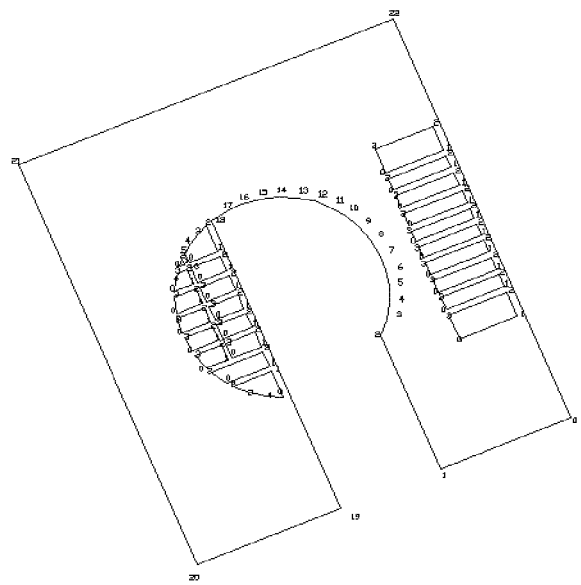
FIGS. 63A-B, 64-72 show the process of division of the complex polygon of an embodiment of the present invention.
Figure 63B:
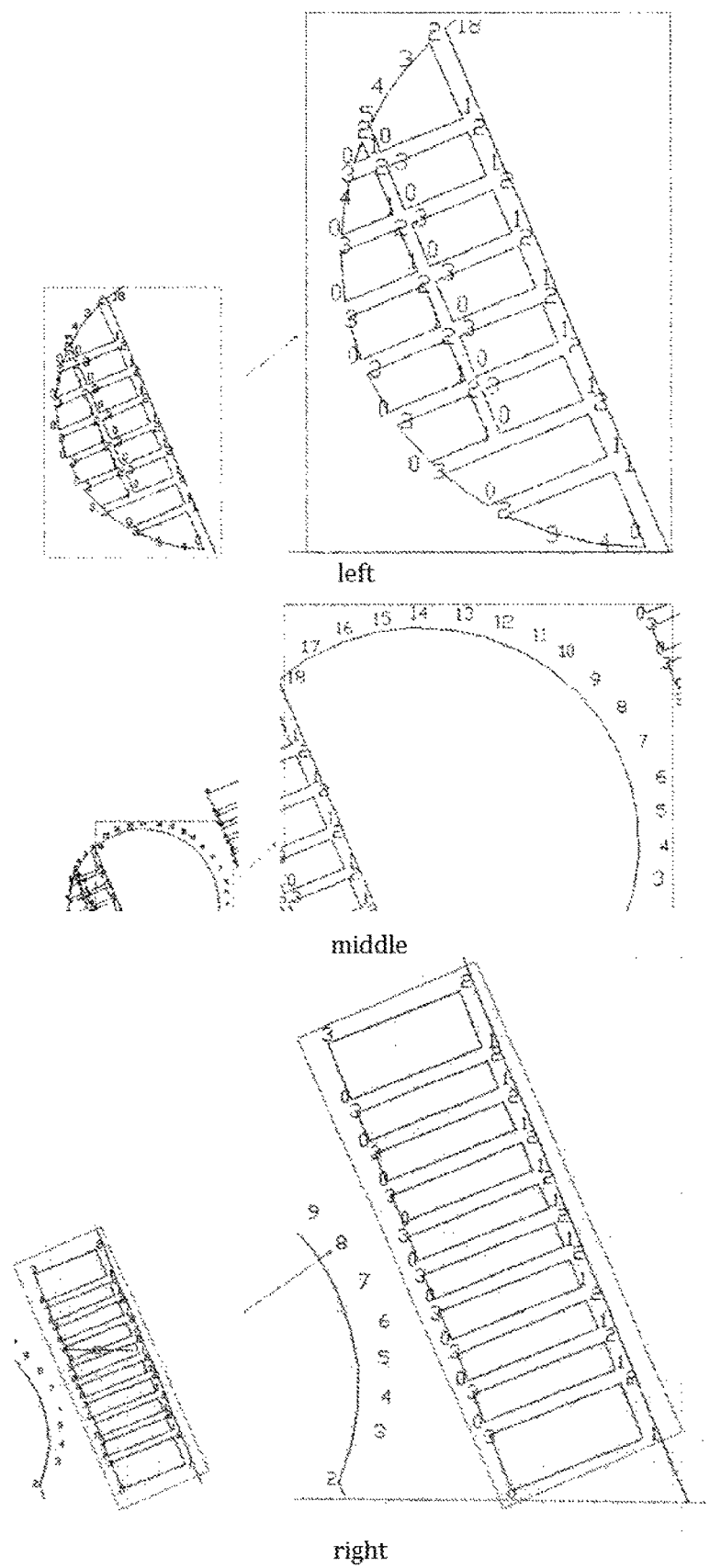
Figure 64:
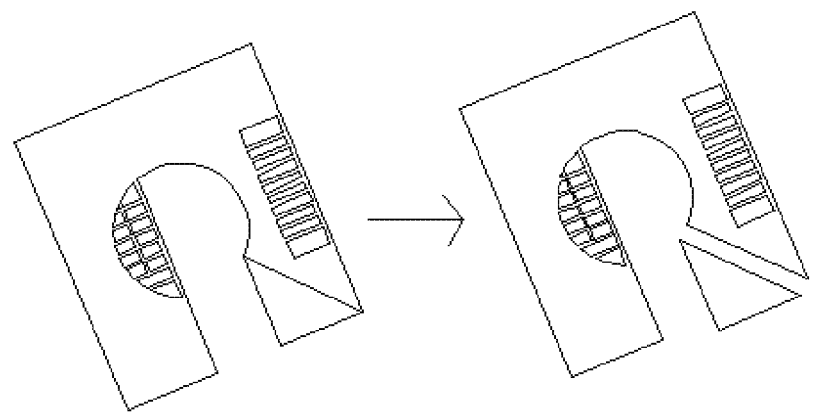

Hereinafter, the division process of the complex polygon above is described in detail as follows by taking the roof in FIG. 63A-B as an example:

Firstly, simplification of exterior boundary of the object in FIG. 63A-B is performed which comprises selecting two non-adjacent nodes on the exterior boundary, and if the line segment between them does not intersect with the interior or exterior boundary and the midpoint of the line segment locates inside the polygon, connecting the two nodes and thereby dividing the polygon into two new polygons. Next, determining which polygon each interior boundary locates in and renumbering the sets of nodes of the polygons as shown in FIG. 64.

Figure 65:
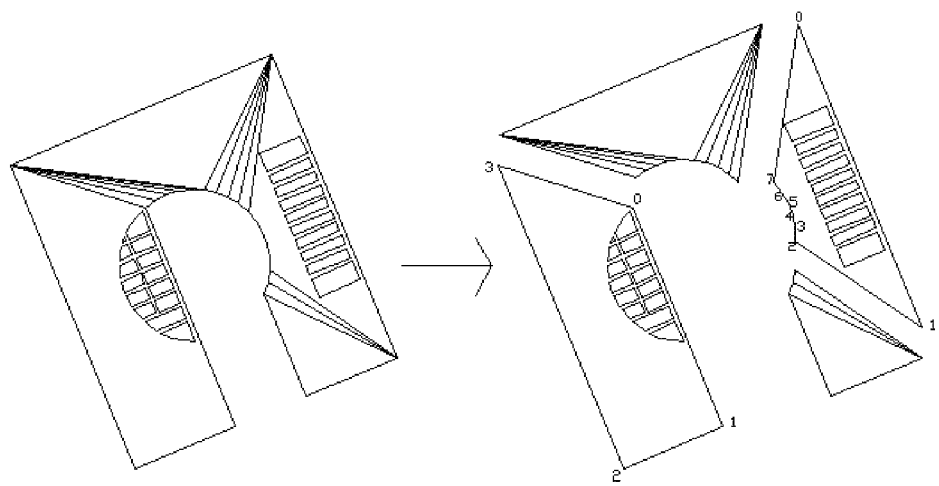

Next simplification of the exterior boundary of the new polygons goes on until it cannot be simplified any further, as shown in FIG. 65.

At this time, the process of interior boundary removal as follows is performed: selecting a node on the exterior boundary, and finding out a node on the interior boundary closest to it, determining whether the line segment between the two nodes intersects with the interior or exterior boundary; if yes, selecting next node on the exterior boundary, and finding out its closest node, otherwise, connecting the two nodes.

Figures 66, 67:
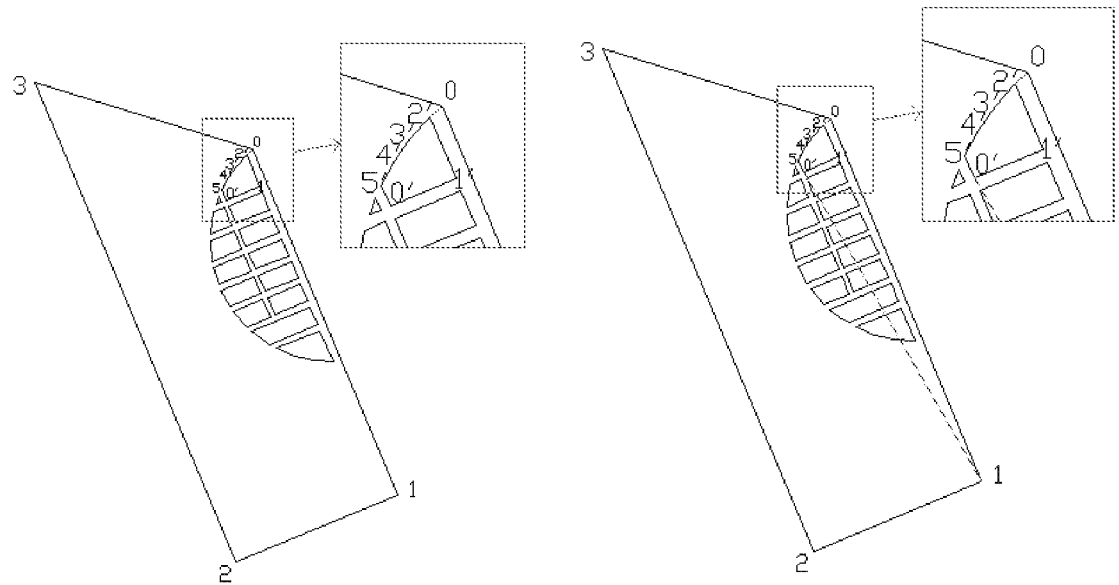

It is described hereinafter by taking a new produced polygon with an interior boundary as an example: selecting node 0 on the exterior boundary and traversing all nodes on the interior boundary one by one; finding out the node 2' closest to node 0, connecting the nodes since the line segment between them does not intersect with the interior or exterior boundary, as shown in FIG. 66.

Figure 68:
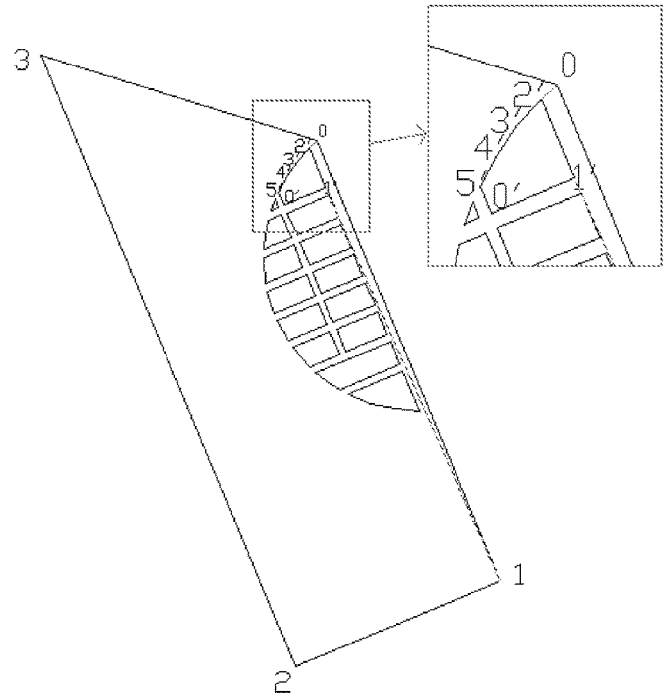

Until now, a line segment connecting the interior boundary and the exterior boundary is found out, next, another line segment with different endpoints should be found out to entirely divide the polygon into two, which further including following steps:

i. selecting node number 1 as a first node and node number 0' as a second node (node number 2' is connected to node number 0, so it is not selected). As shown in FIG. 67: the line segment connecting the first node and the second node intersects with the interior boundary so they are not suitable to be connected with each other and another pair of nodes should be selected.

ii. selecting node number 1 as a first node and node number 1' as a second node. As shown in FIG. 68, the line segment connecting the first node and the second node does not intersect with the interior or the exterior boundary so they are connected with each other.

Figure 69:
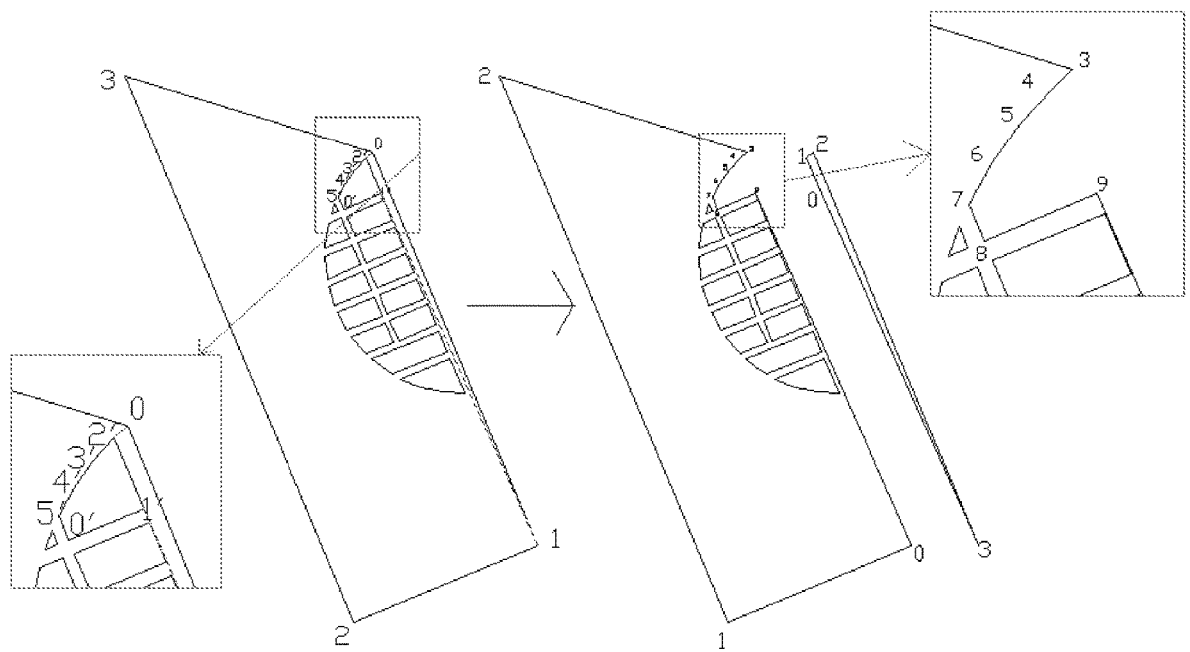

The polygon is divided into two polygons by the two line segments, a polygon enclosed by points (0, 1, 1', 2', 0) and another polygon enclosed by points (1, 2, 3, 0, 2', 3', 4', 5', 0', 1', 1), and these two polygons are renumbered for the next process, as shown in FIG. 69.

Figure 70:
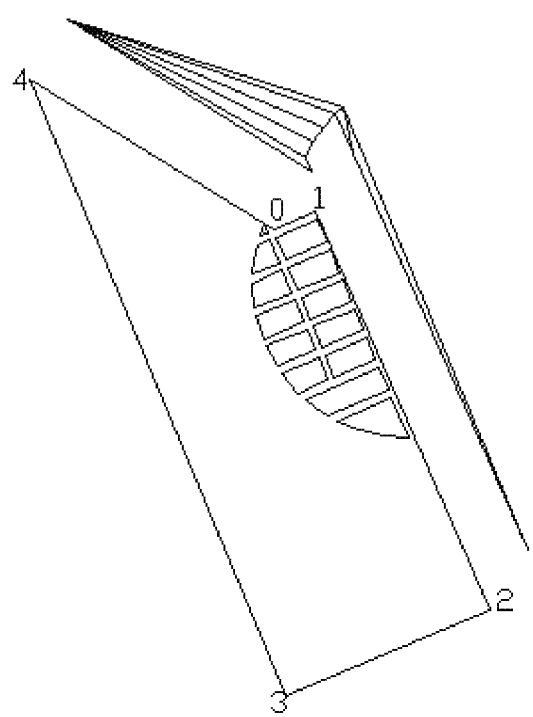

The exterior boundaries of the two new generated polygons are further simplified and the result thereof is shown in FIG. 70.

Figure 71:
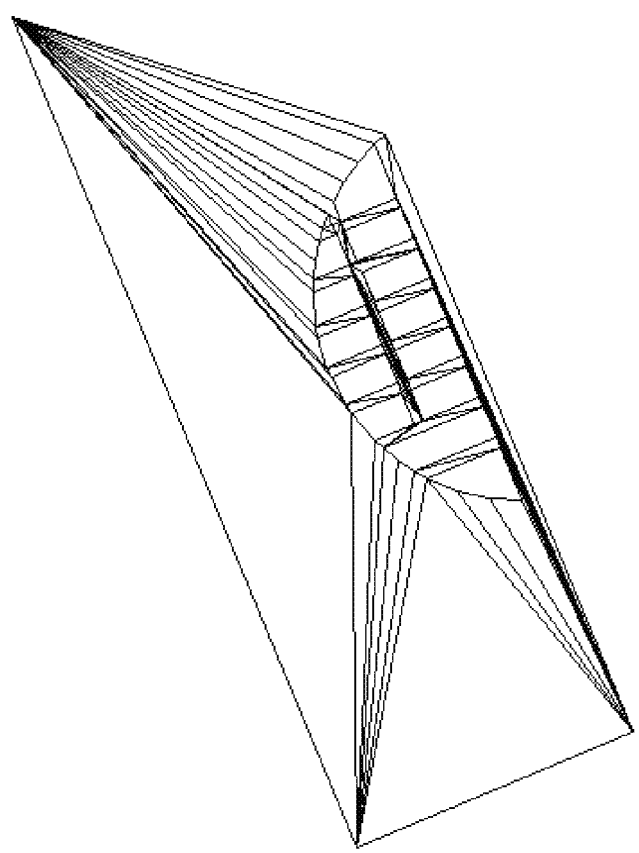

The process of holes removal and simplification of exterior boundary is repeated until the polygons are all divided into triangles, as shown in FIG. 71.

Figure 72:
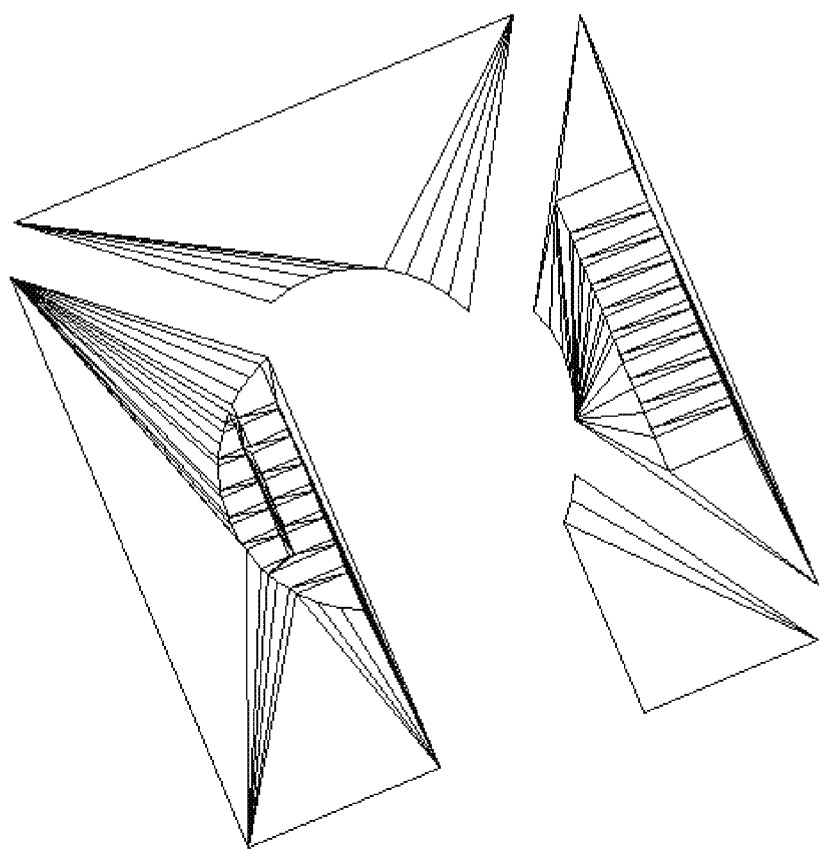

At last, the polygon is divided into a plurality of triangles which are input to 3D engine for modeling, and the polygon after division is shown in FIG. 72.

5. Modeling of a Flat Roof

Roofs can be divided into two types in accordance with elevation values thereof, i.e., the flat roof with an identical elevation value and the non-flat roof with different elevation values, and modeling of a flat roof can be accomplished as follows: the modeling is accomplished by using the plane coordinates of the boundaries and elevation data of the building and dividing complex polygons into a set of triangles seamlessly spliced and find out the drawing order of the triangles through the algorithm for polygon division.

6. Modeling of a Non-Flat Roof

Modeling of a non-flat roof can be accomplished as follows: dividing the roof into different layers in accordance with elevation values and modeling them respectively. Similar to the modeling of flat roofs, the modeling of the polygon on the top of each layer is accomplished by dividing the boundaries into triangles. Just like the modeling of the main body of the building, the modeling of facets of each layer is accomplished by using plane coordinates and elevation data.

Figure 73:
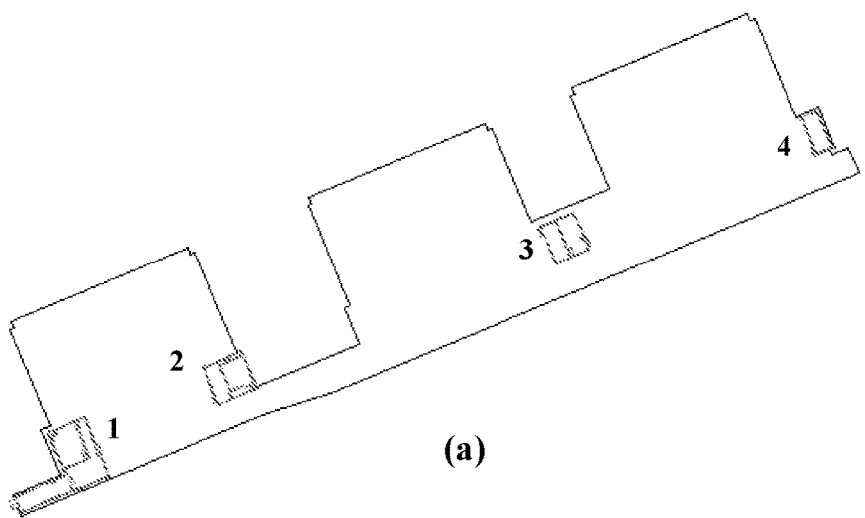
FIGS. 73, 74A-B show the process of the modeling of a building with different elevation values of the present invention.
Figure 73:
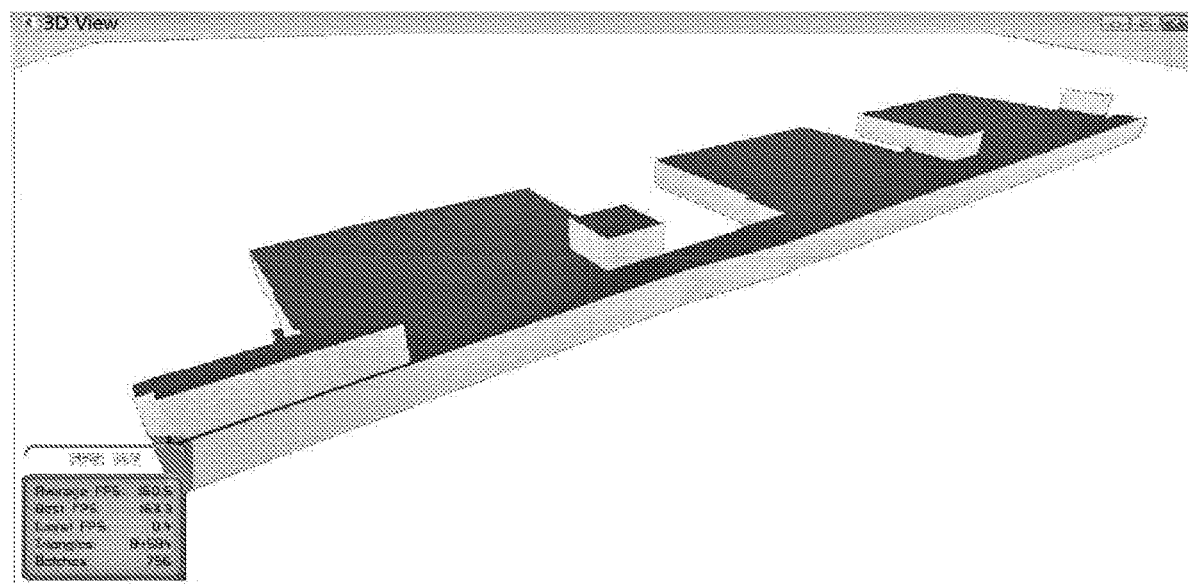
Figure 74A:
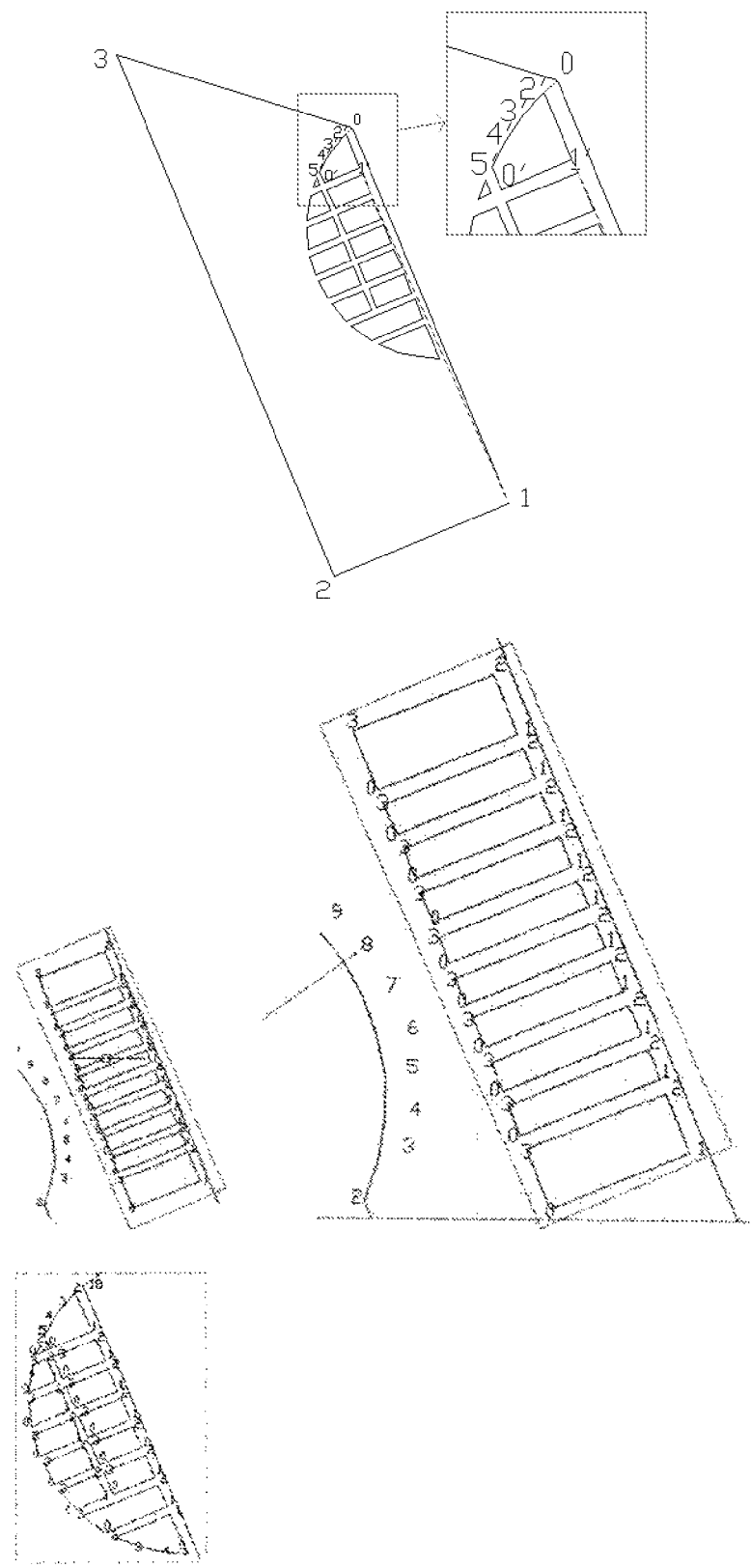
Figure 74B:
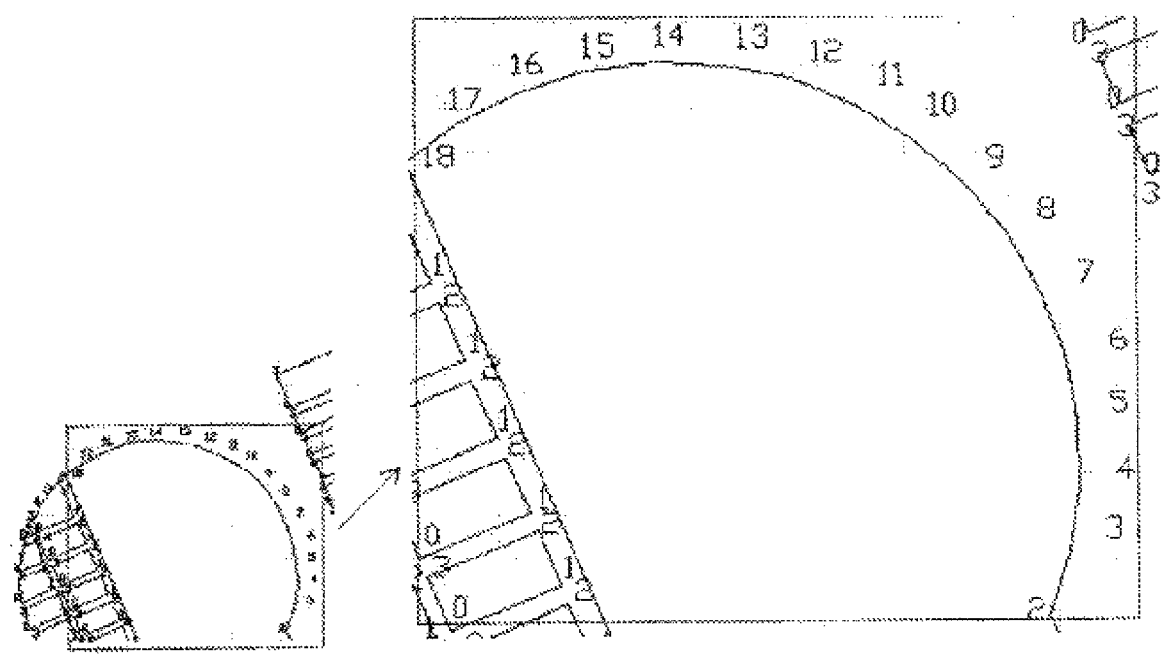

FIG. 73(*a*) shows parts with different elevation values. The layered modeling result is shown in FIG. 73(*b*).

In conclusion, the high-accuracy modeling of complex buildings without human interference can be accomplished by using the method of the present invention, which represents the buildings in detail and no interference is needed so that the highly accurate and efficient modeling can be accomplished.

Hereinbefore described are only preferred embodiments of the present invention, which does not mean any limit to the scope of the protection of the present invention. It should be noted that any modification or improvement carried out by one skilled in the art within the principle of the present invention should be taken as within the scope of protection of the present invention.

What is claimed is:

1. A high-accuracy automatic 3D modeling method for complex buildings, comprising the steps of:

reading and preprocessing data of a building;

wherein the data of a building includes architecture blueprint, working drawings or as-built drawings;

wherein in the reading and preprocessing step, the data of the building are acquired by reading a file containing the data of the building with specific software and the preprocessing involves checking topology, merging adjacent points, normalizing object attributes and assigning elevation values over the data of the building;

wherein in checking topology processing step, nodes of a simple polygon are sequentially connected clockwise, nodes of the exterior boundary of a complex polygon are sequentially connected clockwise, but nodes of the interior boundary are sequentially connected anticlockwise;

extracting information for modeling from the preprocessed data; and modeling a main body and a roof of the building by using the information for modeling acquired in the extracting step;

wherein the main body of the building is modeled based on plane coordinates and elevation data of a boundary of the building acquired from the information for modeling;

wherein an order in which nodes of the boundary of the building are plotted in the information for modeling is rearranged and then input to a 3D engine for modeling;

characterized in that the roof is modeled by determining the shape of the roof based on the plane coordinates of the boundary of the roof acquired from the information for modeling, processing the boundary of the roof based on the determination, and modeling the roof based on the shape of the roof and the elevation data without addition of nodes of the boundary; the modeling of the roof of the building comprises the following steps:

identifying the roof boundary of the building;

determining whether the boundary of the roof of the building is a simple polygon or a complex polygon; and if the boundary of the roof of the building is a simple polygon, automatically dividing the simple polygon into a plurality of triangles by using a method for simple polygon division to acquire information for modeling the roof; or if the roof boundary of the building is a complex polygon, dividing the complex polygon into a plurality of simple polygons by using a method for dividing complex polygon and then acquiring information for modeling the roof by using the method for simple polygon division of the above step;

wherein the method for simple polygon division comprises the following steps:

determining whether the number of nodes of the simple polygon is three;

if yes, indicating that the polygon is a triangle, inputting the information for modeling the triangle to 3D engine;

otherwise, traversing all the nodes of the simple polygon;

selecting any two non-collinear nodes on the exterior boundary of the simple polygon;

connecting these two non-collinear nodes if a straight line connecting the two non-collinear nodes: (i) does not intersect with the exterior boundary, and (ii) has a midpoint located within the polygon, otherwise traversing another pair of non-collinear nodes on the simple polygon until two non-collinear nodes that meet the requirements of (i) and (ii) are found out;

dividing the polygon into two parts by the straight line connecting the two non-collinear nodes to obtain two new simple polygons;

repeating the above steps to divide the new polygons until the number of nodes of each of resulting simple polygons is three;

wherein the method for complex polygon division comprises simplifying the exterior boundary and simplifying an interior boundary, wherein the method for simplifying the exterior boundary further comprises the following steps:

simplifying the exterior boundary of the complex polygon and dividing the complex polygon into a plurality of simple polygons without changing the information for modeling the interior boundary of the complex polygon;

combining the interior and the exterior boundaries of the simplified polygon by a straight line connecting them to obtain simple polygons without the interior boundary; and dividing the simple polygon into a plurality of triangles by using the method for simple polygon division to acquire information for modeling.

2. The method according to claim 1, characterized in that in the extracting step, the information for modeling includes information of 3D coordinates of nodes of exterior and interior boundaries of the building, and elevation information of the building.

3. The method according to claim 1, characterized in that the information for modeling acquired in the extracting step are stored in a form of binary file.

4. The method according to claim 1, characterized in that the modeling of the main body of the building comprises the steps of:
- identifying an exterior boundary of the main body of the building;
- successively reading 3D coordinates of two adjacent nodes on the exterior boundary and elevation data of the building corresponding to the nodes;
- generating two new nodes based on the plane coordinates of the two adjacent nodes and respective elevation data thereof;
- forming two triangles after the generated two new nodes and the two adjacent nodes are numbered anticlockwise;
- splicing the two triangles seamlessly to obtain a side of the building; and
- traversing other nodes on the exterior boundary of the building and repeating the above steps to acquire information for modeling of the main body of the building.

5. The method according to claim 1, characterized in that simplifying the exterior boundary of the complex polygon further comprises the following steps:
- determining whether the number of nodes on the exterior boundary of the complex polygon is three;
- if yes, removing the interior boundary from the complex polygon;
- otherwise, traversing all the nodes on the exterior boundary;
- selecting any two non-collinear nodes on the exterior boundary of the complex polygon;
- connecting these two non-collinear nodes if a straight line connecting the two non-collinear nodes: (i) has a midpoint located within the polygon, (ii) does not intersect with the exterior boundary of the complex polygon, and (iii) does not intersect with the interior boundary of the complex polygon; otherwise traversing other pair of non-collinear nodes on the complex polygon until there are two non-collinear nodes that meet the requirements of (i), (ii) and (iii); and if there is no pair of nodes that meet the requirements of (i), (ii) and (iii) after traversing all the nodes on the exterior boundary, removing the interior boundary from the complex polygon;
- dividing the exterior boundary of the complex polygon into two parts by the straight line connecting the two non-collinear nodes;
- traversing all the nodes on the interior boundary of the polygon and determining which part of two parts the nodes are located in;
- rearranging all the nodes according to their positions on the interior boundary to form two new polygons;
- determining whether the two new polygons contain an interior boundary; and if so, continuing to perform the above method for simplifying the exterior boundary of the complex polygon;
- if there is no interior boundary, indicating that the new polygon is a simple polygon,
- continuing to perform the method for simple polygon division.

6. The method according to claim 1, characterized in that the method for removing the interior boundary of the complex polygon comprises the following steps:
- selecting any one of the nodes on the exterior boundary of the complex polygon;
- traversing all the nodes on the interior boundary of the complex polygon to find out a node closest to the selected node on the exterior boundary;
- connecting these two nodes if a straight line connecting the two nodes: (i) does not intersect with the exterior boundary of the complex polygon, and (ii) does not intersect with the interior boundary of the complex polygon; otherwise traversing all the nodes on the interior boundary until nodes that meet the requirements of (i) and (ii) are founded out;
- combining the interior and the exterior boundaries of the complex polygon by the straight line connecting them into a new exterior boundary;
- rearranging all the nodes of the complex polygon to form a new complex polygon;
- determining whether the new polygon contains an interior boundary;
- if yes, indicating that the new polygon is a complex polygon, simplifying the exterior boundary of the new complex polygon;
- otherwise, indicating that the new polygon is a simple polygon, dividing the new polygon by using the method for simple polygon division.

7. The method according to claim 1, characterized in that in the modeling of the roof of the building, when elevation data of the building are different, the building is layered based on different elevation values, and each layer is modeled respectively.

* * * * *